(12) United States Patent
Vaidya

(10) Patent No.: US 8,774,461 B2
(45) Date of Patent: Jul. 8, 2014

(54) METHOD AND SYSTEM FOR AUTOMATIC DETECTION OF A CLASS OF OBJECTS

(75) Inventor: Nitin M. Vaidya, Shrewsbury, MA (US)

(73) Assignee: MVT Equity LLC, South Deerfield, MA (US)

( * ) Notice: Subject to any disclaimer, the term of this patent is extended or adjusted under 35 U.S.C. 154(b) by 0 days.

(21) Appl. No.: 13/548,530

(22) Filed: Jul. 13, 2012

(65) Prior Publication Data

US 2013/0016201 A1   Jan. 17, 2013

Related U.S. Application Data

(63) Continuation of application No. 12/362,797, filed on Jan. 30, 2009, now Pat. No. 8,224,021.

(60) Provisional application No. 61/036,634, filed on Mar. 14, 2008.

(51) Int. Cl.
*G06K 9/00* (2006.01)

(52) U.S. Cl.
USPC .......................................................... 382/103

(58) Field of Classification Search
None
See application file for complete search history.

(56) References Cited

U.S. PATENT DOCUMENTS

| | | |
|---|---|---|
| 4,901,084 A | 2/1990 | Huguenin et al. |
| 4,910,523 A | 3/1990 | Huguenin et al. |
| 4,940,986 A | 7/1990 | Huguenin |
| 5,047,783 A | 9/1991 | Hugenin et al. |
| 5,073,782 A | 12/1991 | Huguenin et al. |
| 5,145,809 A | 9/1992 | Walker |
| 5,170,169 A | 12/1992 | Stephan |
| 5,202,692 A | 4/1993 | Huguenin et al. |
| 5,227,800 A | 7/1993 | Huguenin et al. |
| 5,760,397 A | 6/1998 | Huguenin et al. |
| 6,396,045 B1 | 5/2002 | Ballingall et al. |
| 6,414,294 B1 | 7/2002 | Marshall et al. |
| 6,791,487 B1 | 9/2004 | Singh et al. |
| 6,859,285 B1 | 2/2005 | Chang |
| 6,870,162 B1 | 3/2005 | Vaidya |
| 6,876,322 B2 | 4/2005 | Keller |
| 6,878,939 B2 | 4/2005 | Vaidya |
| 6,900,438 B2 | 5/2005 | Vaidya et al. |
| 7,064,328 B2 | 6/2006 | Bluzer |
| 7,075,080 B2 | 7/2006 | Vaidya |
| 7,080,940 B2 | 7/2006 | Gotthold et al. |
| 7,088,086 B2 | 8/2006 | Ammar |
| 7,123,649 B1 | 10/2006 | Smith et al. |
| 7,138,905 B2 | 11/2006 | Pavlidis et al. |
| 7,167,583 B1 | 1/2007 | Lipson et al. |
| 7,199,570 B2 | 4/2007 | Ammar |
| 2008/0191925 A1 | 8/2008 | Martin et al. |

OTHER PUBLICATIONS

Haworth et al ("Detection and tracking of multiple metallic objects in millimeter wave images", 2007).*
Bolles et al ("Epipolar plane image analysis: an approach to determining structure from motion").*

(Continued)

*Primary Examiner* — Avinash J Yentrapati
(74) *Attorney, Agent, or Firm* — Burns & Levinson LLP; Bruce D. Jobse, Esq.

(57) ABSTRACT

An apparatus and method for providing automatic threat detection using passive millimeter wave detection and image processing analysis.

56 Claims, 34 Drawing Sheets

(56) References Cited

OTHER PUBLICATIONS

Amato, Ivan., Future Tech: can big brother see right through your clothes? vol. 23, No. 07, Jul. 2002. www.discover.com. Web. Jan. 23, 2007.

Millivision: concealed threat detectors. "Products" www.millivision.com. Millivision Technologies, 2006. Web. Jan. 17, 2007.
Millivision: concealed threat detectors. "Technolgoy" www.millivision.com. Millivision Technologies, 2006. Web. Jan. 17, 2007.

\* cited by examiner

METHOD AND SYSTEM FOR AUTOMATIC DETECTION OF A CLASS OF OBJECTS

CROSS REFERENCE TO RELATED APPLICATIONS

This application is a continuation of the co-pending U.S. Utility application Ser. No. 12/362,797 filed on Jan. 30, 2009, which claims priority to U.S. Provisional Application Ser. No. 61/036,634, filed Mar. 14, 2008, the subject matter of which are incorporated herein by these references in their entirety for all purposes.

BACKGROUND

These teachings relate generally to method and systems for detecting objects concealed on a body.

The task of Automatic Threat Detection ("ATD") is to automatically sense and detect objects that may be concealed on a body and may constitute a threat. Typically, an ATD system uses some form of sensor to provide detection of objects and provide an alarm when needed. Although metallic objects can be identified using well known and ubiquitous metal detectors, the detection of non-metallic objects is more problematic and other forms of detection must be used. Some forms of ATD systems provide imaging a body and these systems must be able to distinguish discrete parts of an image or images that are likely to be objects that are classified as dangerous or as threats from those parts of the image that are likely to be benign.

One form of detection that may be used to identify non-metallic objects is the use of passive millimeter wave ("MMW") radiation. In a passive system, the MMW radiation is detected by a MMW receiver, typically some form of MMW camera that images the body at one or more desired frequencies and provides one or more images of the body for analysis. These images are analyzed to determine the presence of non-metallic objects, in addition to any metallic ones, that may be considered to be threats. Although the prior art has used MMW radiation to detect non-metallic objects, there are several possible improvements with the prior art.

Among the problems in the prior art is that the appearance of benign parts of the subject's body often mimics that of threats in the MMW imagery. Threat-free parts of the human body do have shades of lightness and darkness in the MMW imagery. There is often no clear-cut way of deciding whether a dark region is a benign part of the body or a true threat. (Benign regions of the image that are similar to threats in appearance are termed "clutter".) The availability of images of the subject as they move in front of the camera allows a human observer of the MMW imagery to form judgments about subtle differences in the manner in which true threats traverse the field of view vis-à-vis the progression of clutter regions.

The prior art has attempted to make similar judgments through computer algorithms by analyzing the MMW image frames one at a time and extracts candidate threat information from separate frames and then combines it by some subsequent technique of data association and tracking over time.

BRIEF SUMMARY

An embodiment of the apparatus of these teachings for providing automatic object detection for objects of interest includes a millimeter wave camera having a field of view and that detects millimeter wave radiation within the field of view. The preselected class of objects of interest are all those that are not normal human body parts, or the background. The MMW camera also provides a sequence of spatial images about the periphery of the body. The apparatus also includes image processing system coupled to the millimeter wave camera that is operative to transform the sequence of spatial images of the body into a plurality of spatio-temporal images and classify each of the plurality of spatio-temporal images according to its location within the body's image. This is referred to as a Row Evolution Image ("REI"). The REIs effectively exploit the rotation of the person with respect to the camera to facilitate the task of detection. Within each row evolution image, the image processing system identifies valley edges and ridge features. The image processing system then identifies an object (also referred to as an object of interest) as a function of the identified valley edges and ridge features in each REI. The object detection system then provides an output that is indicative of an object that is a member of the preselected class has been identified.

An embodiment of the method of these teachings for providing automatic object detection of a class of preselected objects includes: Obtaining a sequence of images about the periphery of a body from a millimeter wave camera. Processing the sequence of MMW images to form a plurality of row evolution images ("REI"). Classifying each of the plurality of row evolution image according to its location within the body's image. For each of the plurality of REI, identifying valley edges and ridge features in each image. Identifying an object that is in the preselected class of objects of interest as a function of the identified valley edges and ridge features in each REI. In the event that an object is detected, providing an output indicative of the presence of a detected object.

For a better understanding of the present teachings, together with other and further needs thereof, reference is made to the accompanying drawings and detailed description and its scope will be pointed out in the appended claims.

BRIEF DESCRIPTION OF THE DRAWINGS

FIGS. 19a-19b conceptually illustrate structuring elements in accordance with the disclosure.

DETAILED DESCRIPTION

Figure 1A:
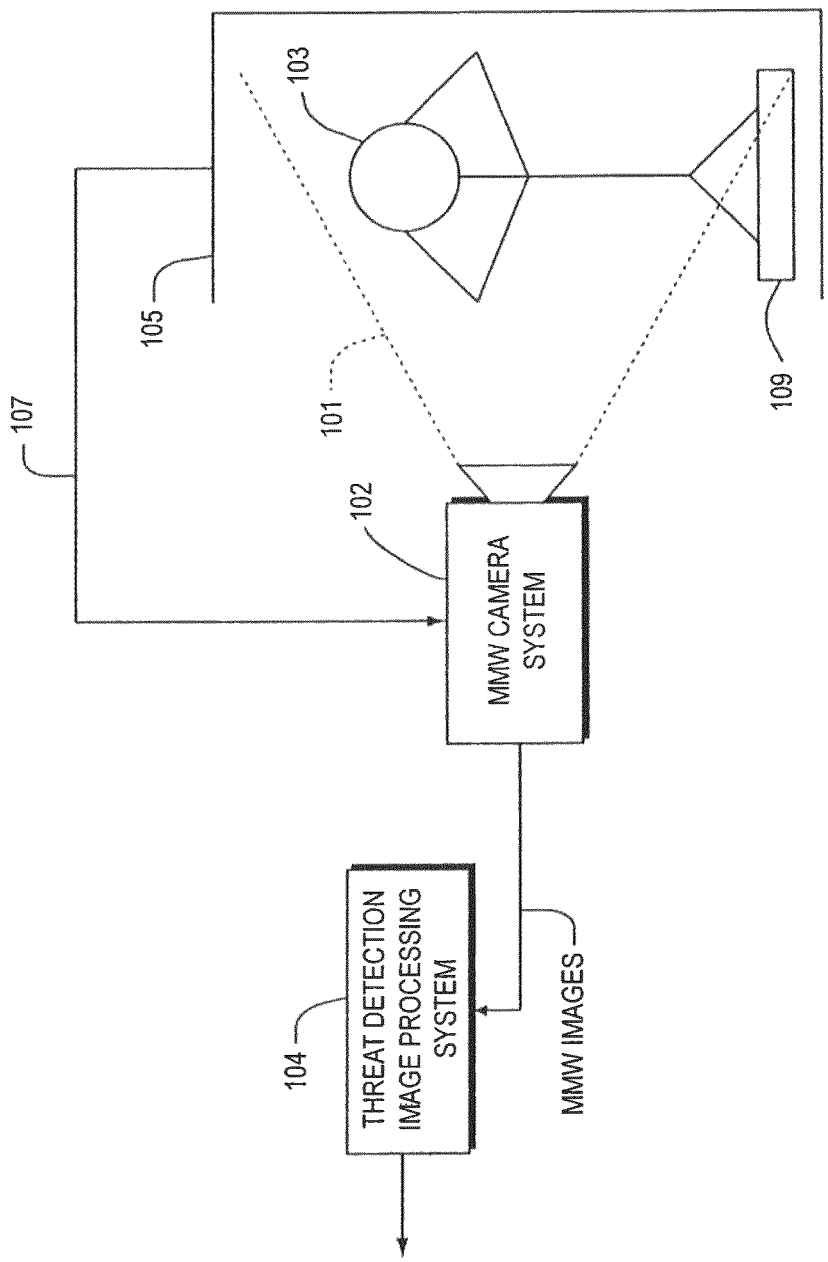
FIGS. 1a-1c depict a block diagram of an embodiment of an automatic object detection system of these teachings.
Figure 1B:
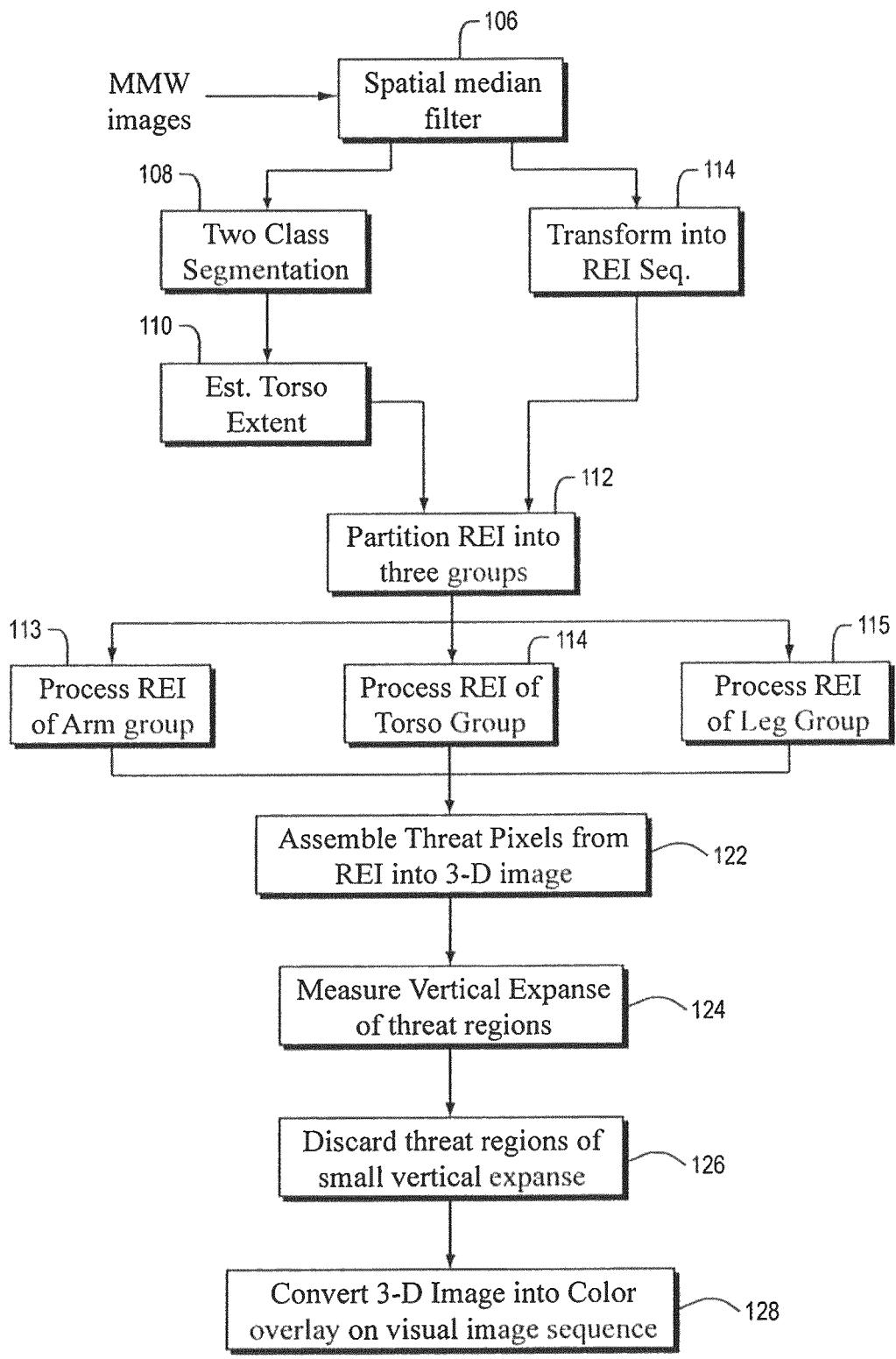
Figure 1C:
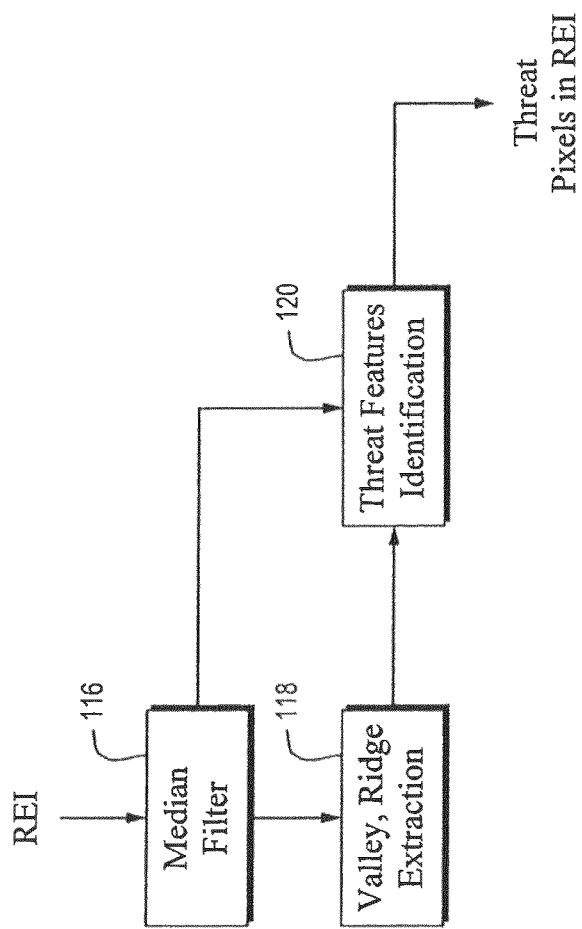

FIGS. 1a-1c depict an embodiment of an automatic threat detection (ATD) system in accordance with the current teachings. In particular, the system 100 includes a millimeter wave (MMW) camera 102 having a field of view 101 within which a subject 103 is standing within an enclosure 105. The field of view 101 includes the interior of the enclosure 105 that at least partially encloses the subject 103 to reduce the effect of external MMW radiation that could be sensed by the MMW camera 102 thereby increasing the noise in the system or altering the contrast in the images, making false positive readings more likely. In the present teachings, the MMW camera 102 provides a sequence of images of the periphery subject 103. In one embodiment, the subject 103 may stand on a platform 109 and may either rotate in front of the MMW camera 102 or the platform 109 itself may be powered and rotate the subject in front of the MMW camera 102. In this way, the subject is imaged about their entire body. In another embodiment, the MMW camera 102 may be affixed to a mechanism 107 that causes the camera to rotate the camera 102 about the subject 103 to image the entire periphery of the subject 103. It should be understood that although the subject depicted in the figures is human, this technique may be used on any living animal or person. Thus, the use of the term body should be understood in a broad sense to encompass both people and animals. It should also be understood that the term objects in the present teachings can refer to any object and in particular, refers to a class of preselected objects that includes knives, weapons, explosives, and other objects that may be dangerous and prove to be a threat to other people, vehicles, buildings, or the general surroundings.

Figure 2:
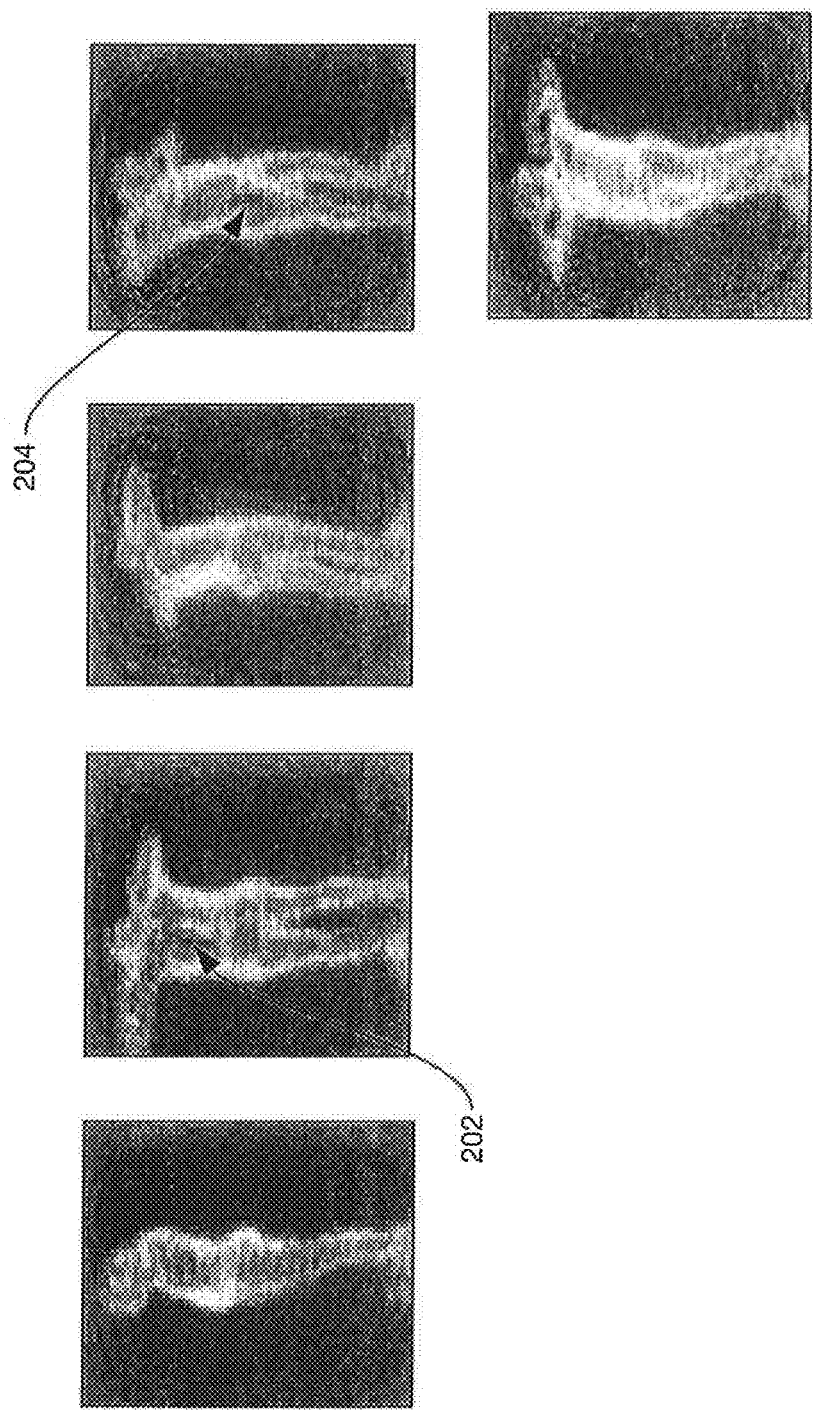
FIG. 2 shows a sequence of 5 exemplar images received from a MMW camera.

The MMW camera 102 provides a sequence of images, $I_1, I_2, \ldots I_N$ as depicted in FIG. 2a. FIG. 2 depicts a set of five image frames taken by the MMW camera 102. Images in the sequence that were free of any threats would appear to be composed mostly of bright pixels, while the background behind the subject would appear to consist of dark pixels. When a subject does conceal a threat, the pixels at that location would be dark in comparison to the pixels of the surrounding parts of the subject's body. In the sequence of images depicted in FIG. 2a, the second and fourth frames show an example of a concealed threat 202 and 204 respectively.

The sequence of images is received by a threat detection image processing system 104 for processing. The images may be filtered using commonly known techniques such as a median filter 106. The filtered sequence of images are then segmented into two classes by segmentation module 108 and concurrently with the segmentation, the height of the torso in the image is estimated by estimation module 110. In one embodiment when detecting objects on humans, the subject stands with their elbows bent and their hands near their ears as they rotate in order to allow the MMW camera 102 to image their entire torso, legs and arms. Elbow locations can then be estimated using image analysis and the general knowledge of the characteristics of the subject and the knowledge that the stance of each subject will be similar. The images that are likely to come from the most direct frontal view of the subject 103 are identified and the approximate shoulder height is estimated from these images. The shoulder height, in conjunction with a preexisting anthropometric model of the subject, is used to predict the subject's crotch height and the spatial image is partitioned into three groups of rows by partition module 112: these groups include the arms, torso, and legs.

The filtered sequence of images are provided to the row evolution image (REI) module 114 that is responsible for converting the sequence of images received from the MMW camera 102 into a sequence of REI. The sequence of images $I_1, I_2, \ldots I_N$ (see FIG. 2b) formed by the MMW camera 102 is a sequence of spatial images formed in distinct time periods. Each image of the sequence can be written as:

$$I_1 = I_1(x, y)$$
$$I_2 = I_2(x, y)$$
$$\vdots$$
$$I_N = I_N(x, y)$$

Where N is the total number of images in the sequence and where x is the horizontal distance in the field of view ranging from $1, \ldots N_X$ and y is the vertical distance in the field of view ranging from $1, \ldots, N_Y$. Moving from one column to the next in an image frame corresponds to incrementing the x coordinate, and from one row to the next corresponds to incrementing the y coordinate.

In general the rotation of the subject 101 causes features on the subject's body, when imaged at different times, to show up at different lateral positions in the field of view over time, i.e., at different locations in different images of the sequence. However, the features appear in each image of the sequence, when they appear, at approximately the same height in each image in which the feature is visible. Thus, because the y coordinate indicates height in a particular image and corresponds to row numbers of image frames, an efficient way to accumulate information about a feature in the imaged scene would be to examine and analyze how brightness of an individual row evolves over time through the entire sequence of spatial images. Thus, each row of an image in the original sequence is assembled, in consecutive order, with the corresponding row with the same y index of each other image in the sequence to form a spatio-temporal row evolution image (REI)

Thus, each image row, in each image, in the entire original sequence of spatial images is to be expressed through a new sequence of such spatio-temporal images $R_1, R_2, \ldots R_{N_Y}$ corresponding to rows at height $y=1, 2, \ldots N_Y$ respectively (See FIG. 2b). Moving from one column to the next in one of the new images $R_y$ corresponds to incrementing the x coordinate in the camera's field of view, just as in the original images. However, moving from one row to the next of the new image $R_y$ corresponds to incrementing the frame number the original sequence of images. The partitioning of the rows of the spatial images by module 112 provides a partitioning of the REIs into the three groups mentioned above—arms, torso, and legs.

Figure 3A:
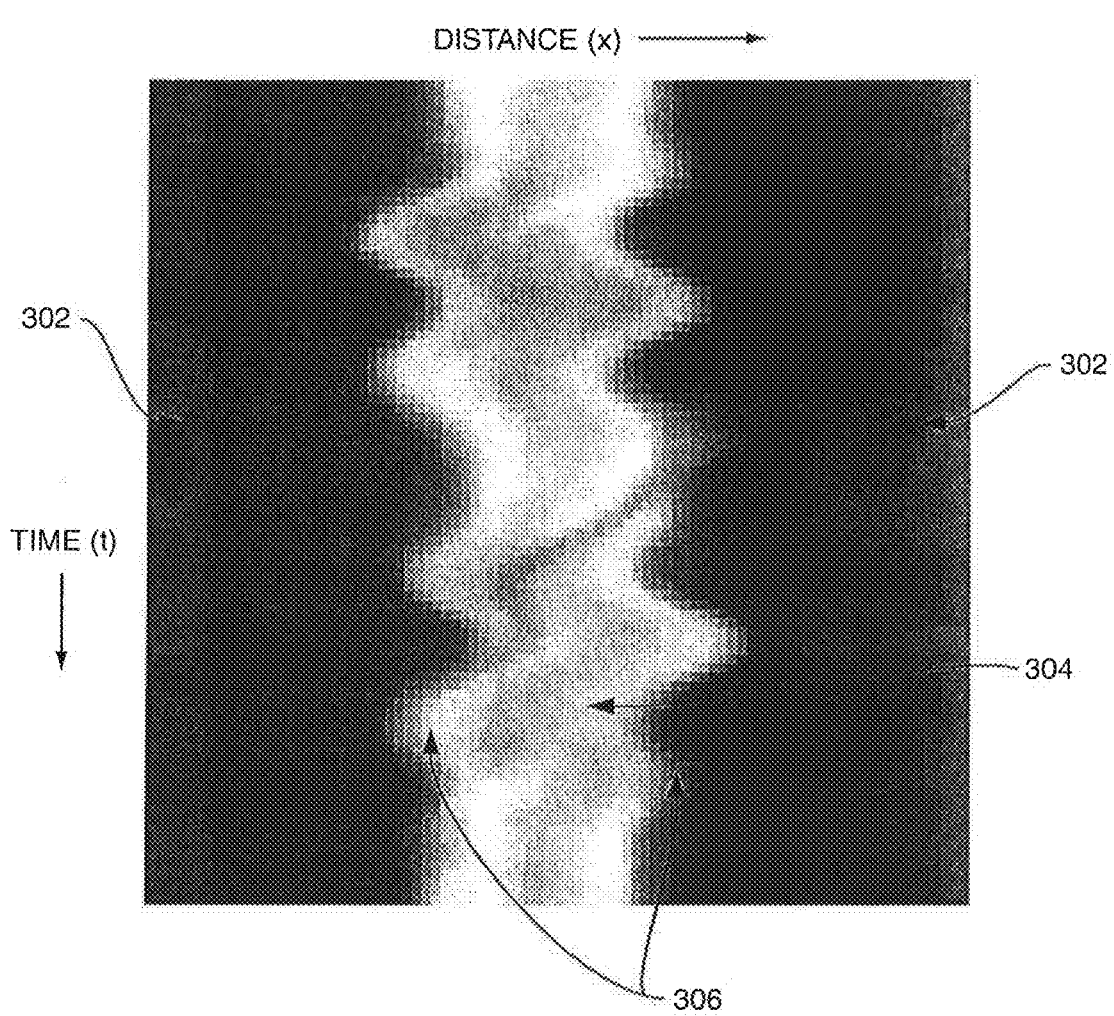
FIGS. 3a and 3b depict how a row evolution image (REI) is formed from a sequence of MMW images such as in FIG. 2.
Figure 3B:
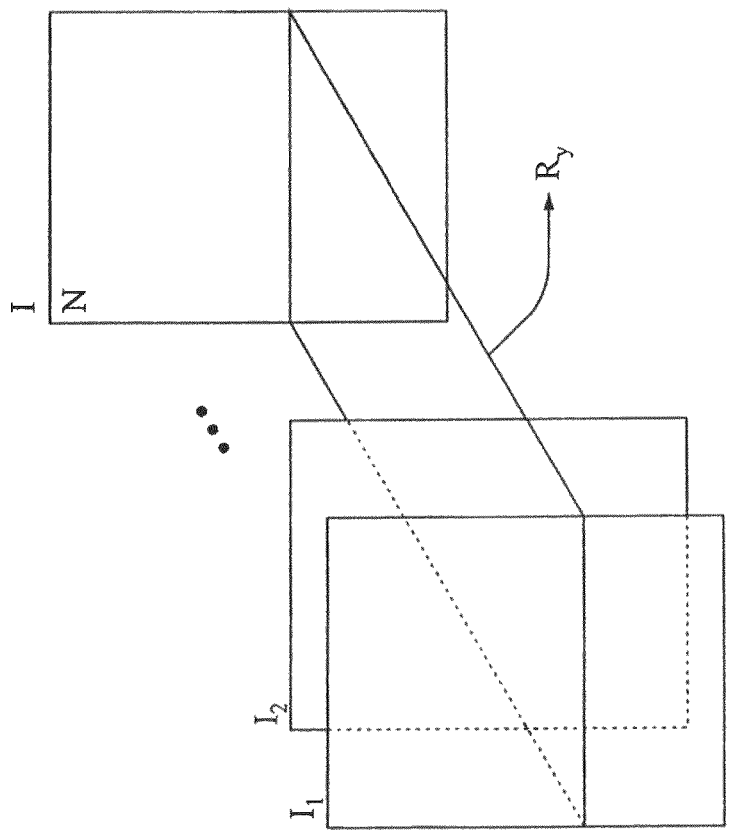

FIGS. 3a and 3b depict how an example of an REI constructed from one of the rows of the MMW image sequence depicted in FIG. 2. The dark areas 302 on the left and right sides of the REI are the background, the bright region 304 in the middle shows the brightness of the subject at a specific height as the entire periphery of the subject is imaged by the MMW camera 102, as depicted in FIG. 3a. The undulating left and right borders of the bright region 306 are a consequence of some degree of inevitable lateral swaying when subjects rotate.

One advantage of using an REI to detect threats, including non-metallic ones, is that the time dependence of the brightness of one or more feature in the scene is explicitly found and analyzed. Thus, threats may be discriminated from non-threats by examining and analyzing features in the REIs that exhibit certain predetermined properties, described in more detail below. Due to the spatio-temporal character of REIs, the accumulation of information from images taken at different times happens in the normal course of extracting features in these REIs, which is a distinction and improvement over prior art.

Figure 4:
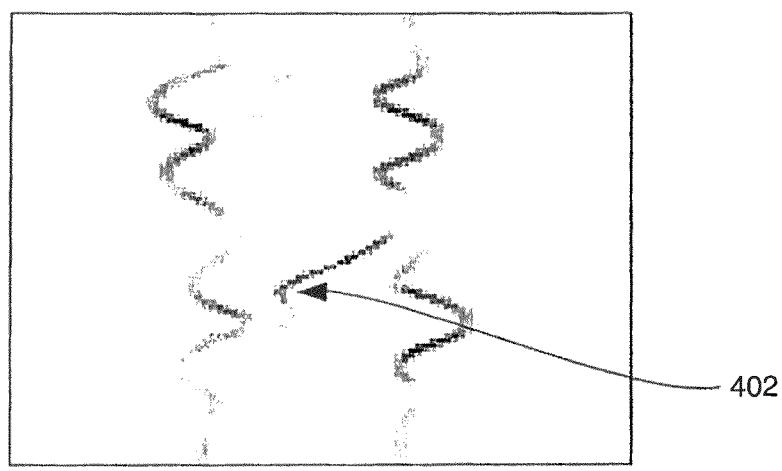
FIG. 4 is a row evolution image depicting valley features.
Figure 5:
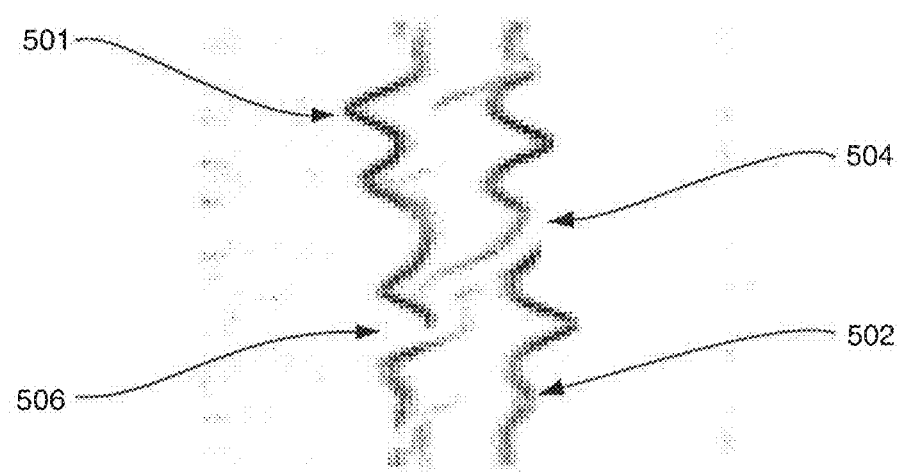
FIG. 5 is a row evolution image depicting ridge features.
Figure 6A:
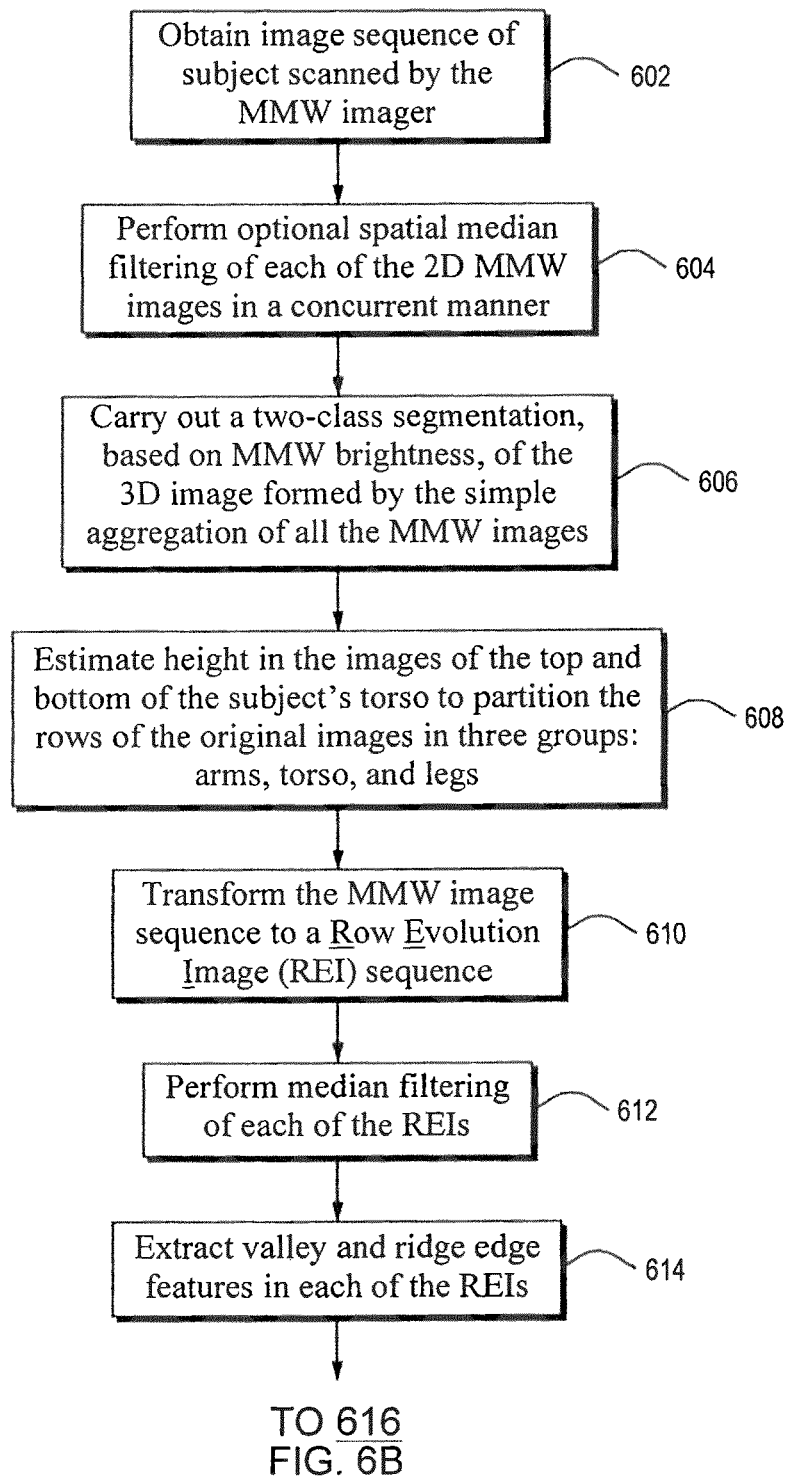
FIGS. 6a and 6b depict a flow chart depicting an embodiment of a method of carrying out these teachings.
Figure 6B:
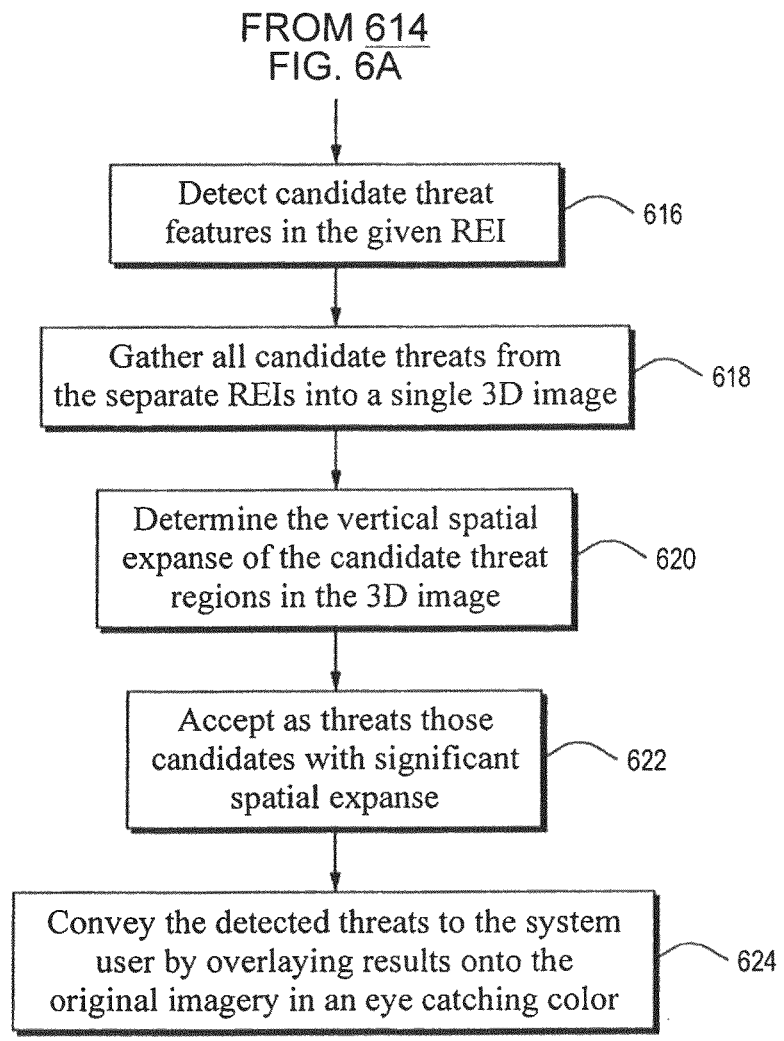

Often threats may be physically small-to-medium sized items that may used as "handheld" threats, e.g., knives, pistols, grenades, CDs etc. A characteristic feature within an REI indicative of these types of objects is a serpentine ribbon of dark pixels extending from one side of the foreground region to the other. Physically this is due to the object appearing from behind the subject at a first point in the subject's rotation, continuing across the field of view of the MMW camera 102, and disappearing behind the subject at a second point in the subject's rotation. These dark pixels that are indicative of this feature may be referred to as "valleys" or "valley edges". This nomenclature, commonly used in the computer vision and image processing literature, is due to the fact that the image brightness values correspond to the height values of an undulating surface atop the image grid, these less-bright features correspond to valleys or lower height areas within the surface image. Similarly, the brighter features correspond to ridges or higher height areas within the surface image. Typically, the valley and ridge strengths represent how low and how high the valleys and ridges extend. A mathematical formulation is provided below. In the absence of any threats on the subject's body, the foreground region is free of such kinds of valleys. FIG. 4 depicts a valley traversing the foreground from right to left across an REI with darker intensity denoting higher strength. As depicted in FIG. 4 of the different valley features between the left and right sides the foreground, the most prominent 402 is the one caused by the actual threat depicted in FIG. 2. As depicted in FIG. 5, the ridge strength map with darker intensity depicting higher strength, 501 and 502 are ridges along the left and right sides of the foreground. Note the gaps 504 and 506 created in the ridges along the left and right sides of the foreground at the points close to the endpoints of the threat valley of FIG. 4.

Even in the absence of threats, the system will include noise and, in addition, clutter may also be found in the image. The system may erroneously identify this noise or clutter as a threat and provide a false positive warning without proper analysis. Noise and clutter within an REI tends to be diffuse areas of dark pixels that, in many cases, do not extend across as large a portion of the REI as do legitimate threats. Physically, this is due to the clutter not being affixed to the person's body and rotating throughout the entire image. In the current teachings, the rejection of clutter—happens during the processing of each individual row evolution image.

The processing of each of the REIs in the three groups in modules 113, 114 and 115 shares a common structure, and is depicted in FIG. 1c. Each individual REI may be filtered to improve certain aspects of the images. For example, median filtering may be performed on each of the plurality of REI images, in parallel with one another, by median filter 116. After filtering each of the plurality of REI images, the valley and ridge features described above can then be identified.

The valley edges and ridges in a REI may be identified and quantified using a family of image feature filters known in the art as steerable filters. Steerable filters, as described in W. T. Freeman and E. H. Adelson, "The Design and Use of Steerable Filters," *IEEE Transactions an Pattern Analysis and Machine Intelligence*, Volume 13, Number 13, pp 891-906, September 1991, and included herein by reference, adapt the computations to optimally follow the desired features despite their seemingly meandering paths through the image. A further advantage of steerable filters is the ability to locate ridge edges (ribbons of bright pixels) as well, with a relatively minor burden of additional computations.

Steerable filters may be designed to filter any desired spatial scale to identify particular features in an REI. For a steerable filter the x-y separable basis set of the impulse responses for filters based on the second derivative of Gaussian may be denoted by $g_a$, $g_b$, $g_c$ and, to emphasize the separability of these filters, they may be expressed in terms of simpler factors $g_{f1}$, $g_{f2}$, $g_{f3}$ as follows.

$$g_a = 0.9213(2x^2 - 1)e^{-(x^2+y^2)} = \left(0.9213(2u^2 - 1)e^{u^2}\right)\big|_{u=x} \cdot \left(e^{-u^2}\right)\big|_{u=y} =$$
$$g_{f1}(u)\big|_{u=x} \cdot g_{f2}(u)\big|_{u=y} \text{ upon defining } g_{f1}(u) \equiv 0.9213(2u^2 - 1)e^{-u^2},$$
$$g_{f2}(u) \equiv e^{-u^2} \quad g_b = 1.843xye^{-(x^2+y^2)} =$$
$$\left(\sqrt{1.843}\, ue^{-u^2}\right)\big|_{u=x} \cdot \left(\sqrt{1.843}\, ue^{-u^2}\right)\big|_{u=y} =$$
$$g_{f3}(u)\big|_{u=x} \cdot g_{f3}(u)\big|_{u=y} \text{ upon defining } g_{f3}(u) \equiv \sqrt{1.843}\, ue^{-u^2} \quad g_c =$$
$$0.9213(2y^2 - 1)e^{-(x^2+y^2)} = \left(e^{-u^2}\right)\big|_{u=x} \cdot \left(0.9213(2u^2 - 1)e^{-u^2}\right)\big|_{u=y} =$$
$$g_{f2}(u)\big|_{u=x} \cdot g_{f1}(u)\big|_{u=y} \text{ using above defined: } g_{f1}(u), g_{f2}(u)$$

The x-y separable basis set for filters for the Hilbert transform fit to the second derivative of Gaussian and are denoted as $h_a$, $h_b$, $h_c$, $h_d$ and expressed in terms of simpler factors $h_{f1}$, $h_{f2}$, $h_{f3}$, $h_{f4}$ as follows.

$$h_b = 0.978(-0.7515 + x^2)ye^{-(x^2+y^2)} =$$
$$\left(0.978(-0.7515 + u^2)e^{-u^2}\right)\big|_{u=x} \cdot \left(ue^{-u^2}\right)\big|_{u=y} = h_{f4}(u)\big|_{u=x} \cdot h_{f3}(u)\big|_{u=y}$$
$$\text{upon defining } h_{f4}(u) \equiv 0.978(-0.7515 + u^2)e^{-u^2},$$
$$h_{f3}(u) \equiv ue^{-u^2} \quad h_c = 0.978(-0.7515 + y^2)xe^{-(x^2+y^2)} =$$
$$\left(ue^{-u^2}\right)\big|_{u=x} \left(0.978(-0.7515 + u^2)e^{-u^2}\right)\big|_{u=y} =$$
$$h_{f3}(u)\big|_{u=x} \cdot h_{f4}(u)\big|_{u=y} \text{ using above defined } h_{f3}(u),$$
$$h_{f4}(u)h_d = 0.978(-2.254y + y^3)e^{-(x^2+y^2)} =$$
$$\left(e^{-u^2}\right)\big|_{u=x} \cdot \left(0.978(-2.25u + u^3)e^{-u^2}\right)\big|_{u=y} =$$
$$h_{f2}(u)\big|_{u=x} \cdot h_{f1}(u)\big|_{u=y} \text{ using above defined } h_{f1}(u), h_{f2}(u)$$

These expressions for $g_{f1}$, $g_{f2}$, $g_{f3}$, $h_{f1}$, $h_{f2}$, $h_{f3}$, and $h_{f4}$, when evaluated at equi-spaced values of independent parameter u, yield the finite impulse response coefficients for the steerable filters. The implicit choice of spatial scale in these expressions is $1/\sqrt{2}$.

A sample spacing of 0.67 is appropriate for calculating filter coefficients at spatial scale $1/\sqrt{2}$. To allow a steerable filter to extract features of some specifically desired scale in the REI, the spacing between samples can be adjusted. For coefficients for filters of spatial scale $\xi$, one must select a sample spacing $\Delta u$ that conserves the product of the scale and spacing. That is:

$$\Delta u = \frac{\frac{1}{\sqrt{2}}(0.67)}{\xi}$$

The impulse response coefficients are then used in each of the corresponding pairs of steerable filters, $(g_{f1}, g_{f2})$, $(g_{f3}, g_{f3})$, $(g_{f2}, g_{f1})$, $(h_{f1}, h_{f2})$, $(h_{f4}, h_{f3})$, $(h_{f3}, h_{f4})$, $(h_{f2}, h_{f1})$. Each pair of coefficients are convolved row-wise and then column-wise respectively with the corresponding REI to obtain the images $G_a$, $G_b$, $G_c$, $H_a$, $H_b$, $H_c$, $H_d$. From these, the image $G^{\theta_d}$, the response of the second derivative of Gaussian filter rotated to the dominant local orientation is formed. In a similar manner, the image $H^{\theta_d}$, the response of the Hilbert transform of the second derivative of Gaussian filter rotated to the dominant orientation, is computed. The images $G^{\theta_d}$ and $H^{\theta_d}$ are used to compute the oriented energy $E(\theta_d)$ as the strength of the quadrature filter pair response steered to the direction of the dominant orientation using $E(\theta_d) = (G^{\theta_d})^2 + (H^{\theta_d})^2$, and the pixel-wise local phase given by the image $\phi = \arg[G^{\theta_d}, H^{\theta_d}]$.

The local phase information conveys whether the pixel falls in the category of valleys, ridges, or some other feature, and the oriented energy conveys the strength of the feature. The strength of the valleys and ridges can be calculated using a variety of functions. In one embodiment, it is useful to further accentuate the filtered output, over and above that described in prior art, by squaring the values, as shown in the following expressions for the images of phase preference factors $\Lambda_{Valleys}$ and $\Lambda_{Ridges}$ for valleys and ridges.

$$\Lambda_{Valleys} = \begin{cases} \cos^4(\varphi) & -\pi/2 \leq \varphi \leq \pi/2 \\ 0 & \text{otherwise} \end{cases}$$

$$\Lambda_{Ridges} = \begin{cases} \cos^4(\varphi) & \pi/2 \leq \varphi \leq 3\pi/2 \\ 0 & \text{otherwise} \end{cases}$$

The images V and W that indicate the valley and ridge strengths respectively are computed as follows.

$$V = E(\theta_d) \cdot \Lambda_{Valleys} \quad (1)$$

$$W = E(\theta_d) \cdot \Lambda_{Ridges} \quad (2)$$

The valleys that the above technique helps identify are preliminary candidates to be categorized as threats. The nature of clutter is such that it is considerably suppressed by the choice of features to pursue in the REIs and due to the ability of the steerable filters to follow a particular feature through its path in the image. However, there will be unavoidable instances of clutter pixels that organize into valleys that are compact enough and dark enough to enter the pool of preliminary threats.

To further reduce the effect of clutter on the threat detection system, an evaluation is made of the ribbons of bright pixels lie along the left and right edges of the foreground, i.e. ridges in the REI. These ridges are broken in places where the valleys of true threats cross them as they traverse the foreground during the rotation of the subject. In contrast, the valleys arising from clutter do not tend to cause such breaks in the ridges at the foreground edges.

As discussed above, the valley and ridge features are identified and provided to threat detection module 120, specialized for each of the three groups of REIs, that is operable to detect threats on the arms, torso and the leg. A part of the threat detection is a clutter detection module that is operable to analyze the REI's valley and ridge data to determine if a feature is likely clutter in order to reduce false positive indications. In the event that a candidate threat is detected and is determined that it is not likely to be clutter, the particular threat pixels from the REI are provided to 3-dimensional image formation module 122 that assembles the threats from all REIs. Module 122 converts the 2-dimensional REI images into a 3-dimensional spatial representation that is then provided to measurement module 124 that determines the spatial extent of the detected threat regions. This value is compared to a threshold value by comparison module 126, and in the event that the detected threat exceeds the threshold, an indicator is provided to the operators of the system as a color enhanced image, created by image enhancement module 128 as an overlay of the original image. The image may be enhanced using color, grey scale, texture, or other enhancements to provide an ease of examination for the human operators viewing the image. As can be seen, only in the event that a potential threat is detected do the human operators view any aspect of the bodies of the people being imaged, thus preserving the privacy and dignity of the subjects being imaged by this system.

In general, probable threats are identified by identifying valley features within a REI that satisfy at least one of four different conditions. The valley and ridge strengths may be compared to one or more predetermined threshold values and either ordinary thresholding, hysteresis thresholding, or both may be applied to the values given by Equations (1) and (2) above. These predetermined threshold values are selected to be indicative of the strength of the valley features on the foreground. In the present teachings, three different pre-determined threshold values are used.

In the first case, the valleys with strength exceeding the highest threshold value are deemed likely threats outright and no further analysis is needed.

In the second case, the valleys with strength only exceeding the middle threshold value, but are less than the highest threshold value, are further examined to discriminate between actual threats and clutter or noise. This additional analysis can include examining the end points of these valleys and the valleys that have at least one of their endpoints at a foreground-background transition edge are deemed likely threats. As discussed above, actual threats tend to have appreciable valley strength from the point they enter the field of view up to the point of their exit from the field of view.

In the second instance, the remaining valleys that exceed the middle threshold value but are less than the highest threshold value are further examined to determine if these valley features are clutter or a likely threat. In this instance, the neighborhoods of each of the endpoints of these valley features are examined as to whether a path, unobstructed by a ridge edge, exists for extending the feature up to the background. The valley features that have such a plausible path are then also deemed possible threats.

The valley features that only exceed the lowest threshold but were less than the middle value threshold are examined and the features of the valleys are analyzed. In particular, those valley features that contain contiguous sets of pixels having a MMW brightness that is significantly low, and therefore threat like, are also examined. Such valley features may be examined using one or more of the following criteria: if these features have a predetermined number of particularly dark pixels, have a predetermined median brightness of the valley, have a dissimilarity from clutter, have an orientation within a predetermined range with respect to the sides of the foreground, or a combination of any of these tests may be used and features that are detected by one or more of these tests are then are deemed likely threats.

In addition to the identification of valley features, the foreground structure is also analyzed to determine if there is evidence of a wide threat traversing from the right side of the REI foreground to the left side. Suitable region features that are positive for being a wide threat extending across the field of view are also deemed likely threats.

When examining and analyzing the subject's torso, crevices in the foreground regions extending from the background edge into the interior of the foreground region of the REI are the kind of anomalies that suggest the presence of threats, with the larger crevices corresponding to wider threats. The spatial structure of the foreground area in the segmented REI is probed with the help of four specific image morphology structuring elements, discussed in more detail below. For morphological image processing, see generally the web page, http://homepages.inf.ed.ac.uk/rbf/CVonline/LOCAL_ COPIES/GASTERATOS/SOFT/2.htm. The segmented REI is subjected to morphological closing with each of these elements. The first closing fills in crevices starting on the left side of the foreground, and all of the area to the right of the foreground; the second fills the crevices starting on the right side, and all the area to the left of the foreground. Their intersection is an augmented foreground with the potential anomalies, and occasionally benign undulations of the sides, filled in. The area added to the foreground, D, is pruned to keep just the likely threat related areas. For this the results of closing of the foreground with the third and fourth elements proves useful, since they lead to a conservative filling-in of certain kinds of crevices, i.e., crevices that are non-horizontal in the REI, and thus likely to arise from threat traversing from upper right of the foreground to the lower left. Only those connected components of D are retained that intersect this conservatively filled-in subset of crevices. These regions are returned as likely threats on the subject's body. A modified segmented REI, with the foreground augmented with these threat regions, is also returned.

The identification of anomalies that suggests the presence of wide threats in the REIs of the person's legs focuses on the foreground-background interface contours. The presence of naturally occurring gaps between legs in the interior of the foreground makes the use of the torso threat analysis less than optimal in detecting threats on legs. Thus, the system needs to predict the location of gaps between the legs to prevent those regions being regarded threats. Points of abrupt discontinuities in the foreground-background interface contours are used to infer the possible presence of threats. At each such discontinuity, a region of interest is demarcated, one that includes the adjacent background pixels. In case some of these pixels are actually due to a threat on the subject, they would likely have an image intensity that, while deemed more background-like in the original segmentation of the REI, would be subtly different from the bulk of background pixels. To determine if this is the case, the pixels in just the above region of interest are subjected to a two-class segmentation. The set of brighter pixels in the result reasonably close to the point of discontinuity are returned as tentative threat regions, with the stipulation that further validation be applied to them before accepting them as likely. A modified segmented REI, with the foreground augmented with these threat regions may also be examined.

One problem with automatic threat detection systems in the prior art has been a large number of false positives. A clutter detection module is provided to reduce the occurrence of false positive indications. The geometric attributes of a given feature, such as a valley edge, are examined to determine whether the feature is more likely than not to be clutter. True threats traverse the field of view from the right to the left in REIs, with gradually increasing and diminishing horizontal distance to the foreground's right and left sides respectively. The closer the pertinent distance values are to zero at the top right and bottom left of the feature, the more likely it is to be a threat. Features that run parallel to either side of the foreground, appear to meander within the foreground, appear to traverse from left of the field of view to the right, or do not closely approach the sides of the foreground are deemed more likely to be clutter. These attributes can be estimated with confidence only if the feature has time persistence greater than some minimal number of frames. A weighted sum of scores, computed from the binary results of comparing values of various such attributes with pre-selected thresholds, is used to make the Boolean determination of the feature being benign clutter.

As discussed above, the time required to carry out the various ATD computations is an important factor in determining the maximum throughput of people through the system. The present teachings provide for the concurrent execution in the threat detection approach described herein. The non-overlapping nature of the information conveyed by distinct rows when a person is imaged while rotating means that very little data needs to be exchanged with neighboring row evolution images once the processing of individual row evolution images commences. This allows parallel execution of REI processing as an advantageous path and the system described herein avails itself to just such a parallel implementation.

Algorithms for practicing a method of the current teachings are provided for in FIGS. 6-17. As depicted in FIGS. 6a-6b, a high level method for practicing the present teachings is provided for, in particular the method includes, as depicted in FIGS. 6a-6b, the image sequence of subject scanned by the MMW imager is provided as depicted in step 602. The sequence of images are filtered using a spatial median filtering, this may be done in a concurrent manner, as depicted in step 604. The filtered images are segmented in a two-class segmentation process, based on the brightness of the pixels in the MMW images to provide an approximate separation of the foreground area from the background, as depicted in step 606. The height of the image is estimated and estimates of the top and bottom of the subject's torso is made to partition the rows of the original images into three groups: arms, torso, and legs as depicted in step 608. The sequence of spatial images is transformed into a sequence of a plurality of Row Evolution Images (REI), as depicted in step 610. The plurality of REI are filtered using a median filtering, this may be done in a concurrent manner, as depicted in step 612. The valley and ridge edge features are extracted in each of the plurality of REIs. This may be done in a concurrent manner, as depicted in step 614. Candidate threat features in each of the given REI are detected, this may be done concurrently for each of the plurality of REIs, as depicted in step 616. The candidate threats identified from each of the REIs are assembled into a single 3D image, as depicted in step 618. The vertical spatial expanse of the candidate threat regions in the 3D image are determined, as depicted in step 620. The vertical expanse is compared to a predetermined threshold value and threats that exceed this threshold value are accepted, as depicted in step 622. The detected threats are provided to the system operator by overlaying the results onto the original imagery in an enhanced manner, as depicted in step 624.

Figure 7A:
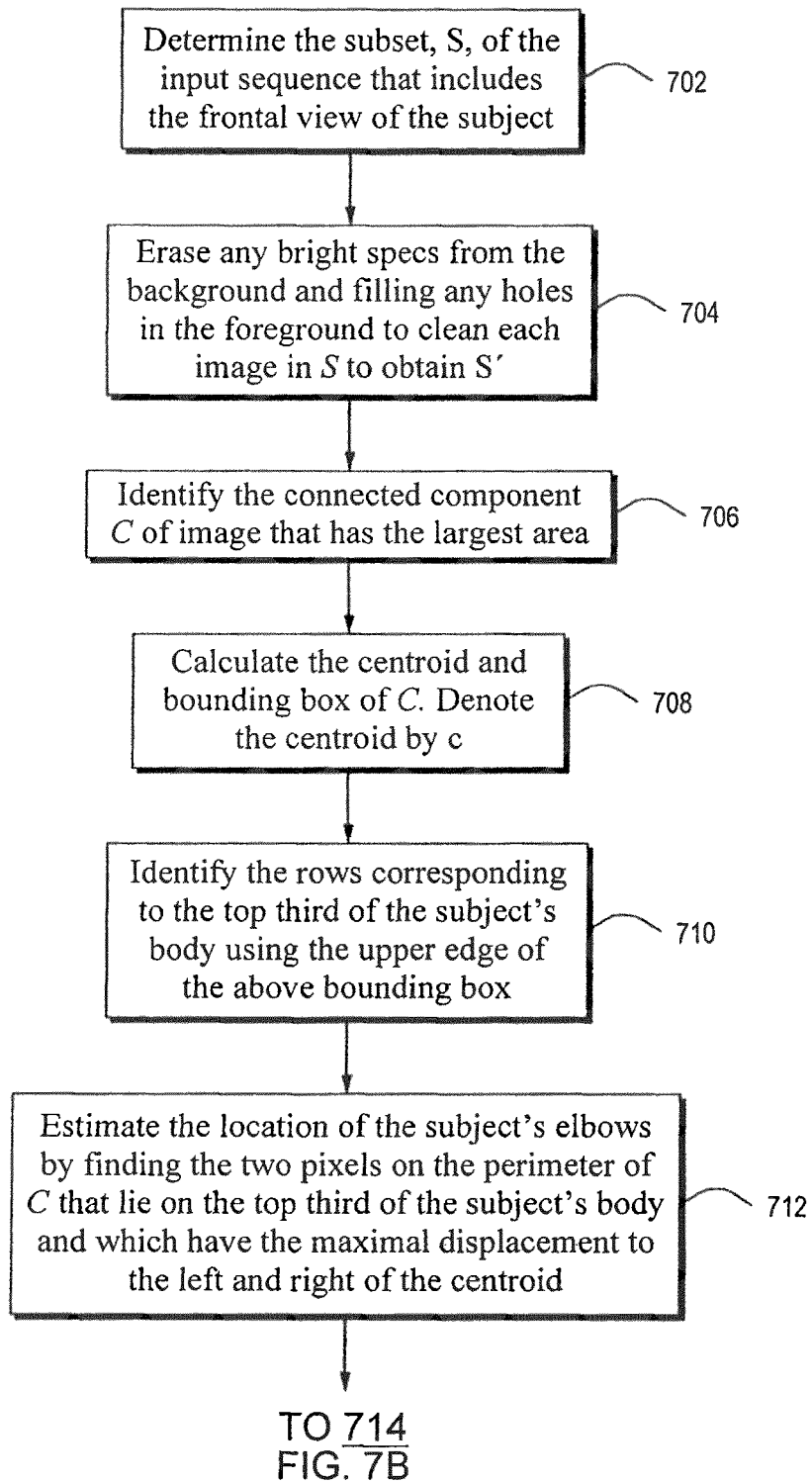
FIGS. 7a and 7b depict a flow chart depicting an embodiment of estimating the torso of a body in accordance with these teachings.
Figure 7B:
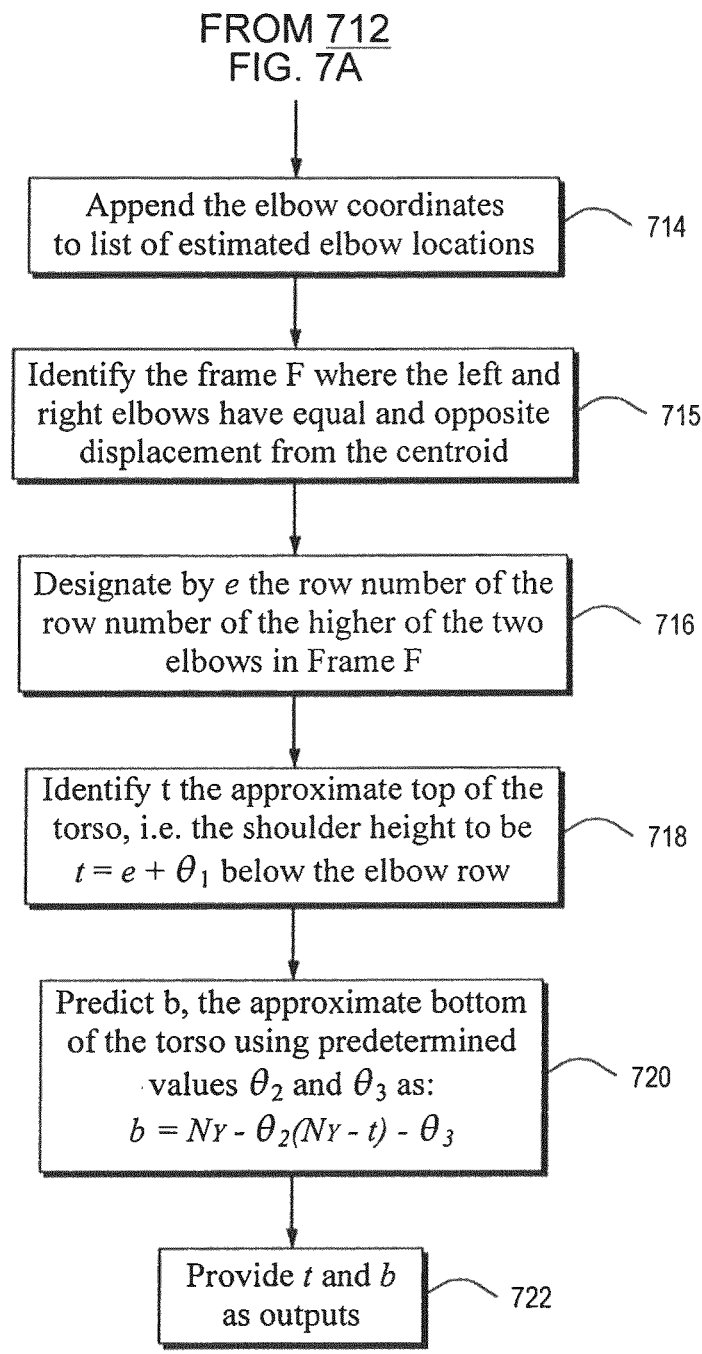

FIG. 7 depicts a method of estimating the extent of a subject's torso using the sequence of images provided by the MMW camera. Inputs include the binary image sequence $S_1$, $S_2, \ldots S_N$ that indicates the foreground areas in the MMW image sequence $I_1, I_2, \ldots I_N$, values of free parameters $\theta_1, \theta_2, \theta_3$, and the outputs include: Row numbers of the top and bottom of the torso, t and b respectively. In particular, the method includes the following. Determining the subset, S, of the input sequence that includes the frontal view of the subject, as depicted in step 702. Filtering the sequence of spatial images by erasing any bright specs from the background and filling any holes in the foreground to clean each image in S to obtain S', as depicted in step 704. Identifying the connected component C of image S' that has the largest area, as depicted in step 706. Calculating the centroid, c, and finding the bounding box of C, as depicted in step 708. Identifying the rows corresponding to the top third of the subject's body using the upper edge of the above bounding box as a rough estimate of the height of the subject, as depicted in step 710. Estimating the location of the subject's elbows by finding the two pixels $p_L$ and $p_R$ on the perimeter of C that lie on the top third of the subject's body and which have the maximal displacement to the left and right of the centroid c, as depicted in step 712. Appending the coordinates of $p_L$ and $p_R$ to a list of estimates of estimated elbow locations, as depicted in step 714. Steps 704 to 714 may be done in a concurrent manner on each of the plurality of images in subset S. Once the list of estimated elbow locations has been formed, identifying the frame wherein the estimated left and right elbows have essentially equal and opposite horizontal displacements from the estimated centroid, c. Designating by e the row number of the higher of the two elbows in this frame, as depicted in step 716. Identifying t, the approximate top of the torso, i.e., the shoulder height, to be a predetermined value, equal to a predetermined constant representing the number of rows, $\theta_1$, below the elbow row as follows: $t=e+\theta_1$, as depicted in step 718. Predicting b, the approximate bottom of the torso (crotch height), by relating it to the shoulder height by using the following expression that is based, in part, on anthropometric statistics of people's body proportions using predetermined values $\theta_2$ and $\theta_3$: as $b=N_y-\theta_2(N_y-t)-\theta_3$, as depicted in step 720. Providing t and b as outputs, as depicted in step 722.

Figure 8:
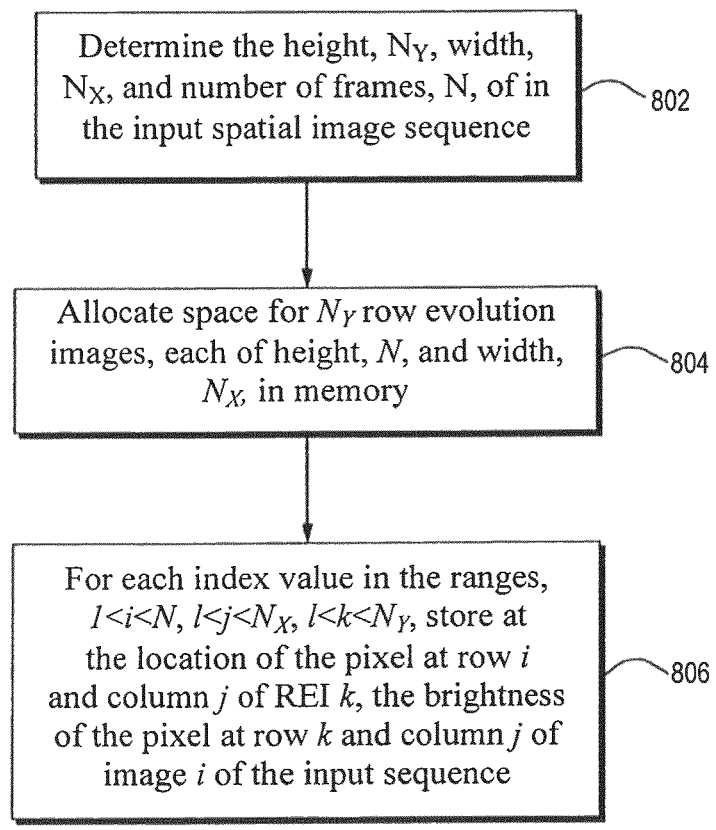
FIG. 8 is a flow chart depicting an embodiment of forming row evolution images in accordance with these teachings.

FIG. 8 depicts a method for transforming the sequence of spatial images provided by the MMW camera into a sequence of row evolution images. The input is the MMW image sequence $I_1, I_2, \ldots I_N$ and the output is the Row Evolution Image (REI) sequence. In particular, determining the height $N_Y$, width $N_X$, and number of frames of N in the input spatial image sequence, as depicted in step 802. Allocating space for $N_Y$ row evolution images, each of height N and width $N_X$ in memory, as depicted in step 804. Performing step 806 for each index value in the ranges $1 \le i \le N$, $1 \le j \le N_X$, $1 \le k \le N_Y$. Storing at the location of the pixel at row i and column j of REI k, the brightness of the pixel at row k and column j of image i of the input sequence, as depicted in step 806.

Figure 9:
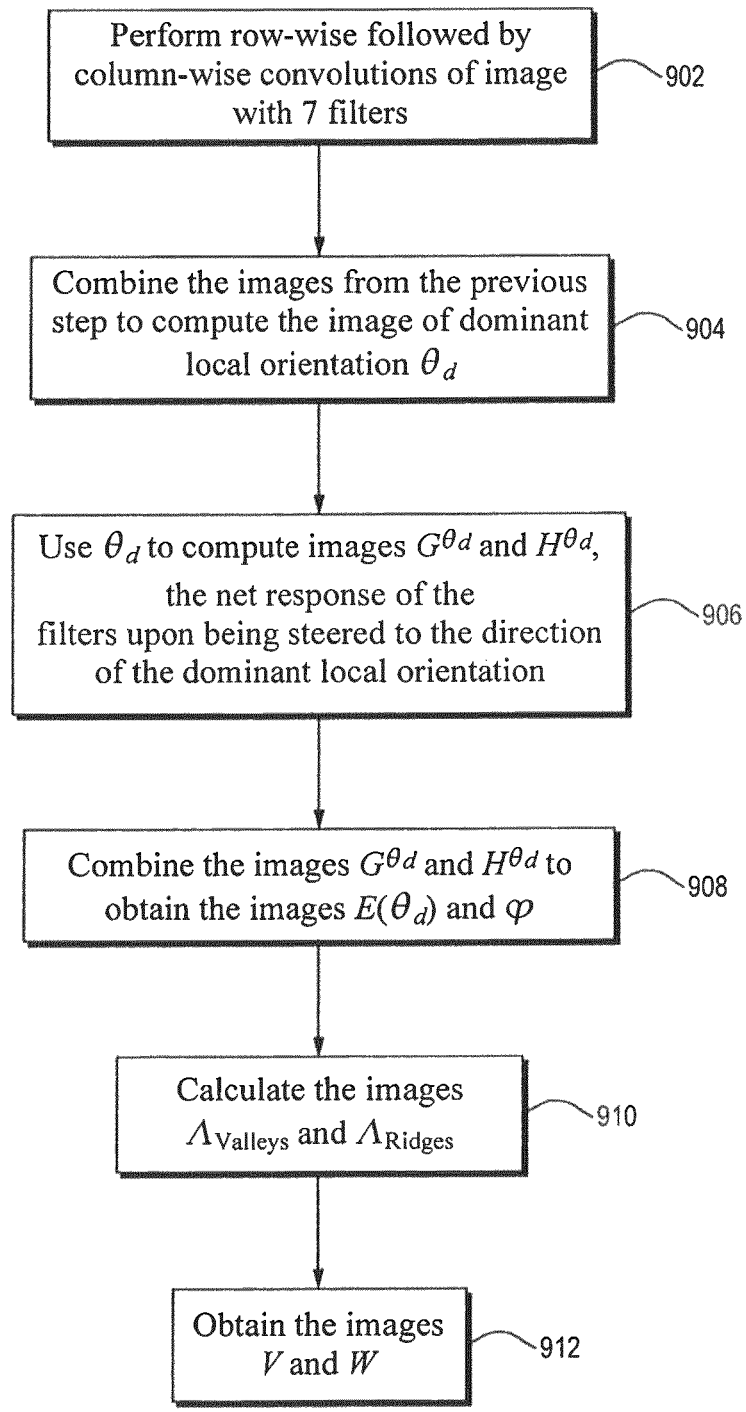
FIG. 9 is a flow chart depicting an embodiment of extracting valley and ridge features in accordance with these teachings.
Figure 10A:
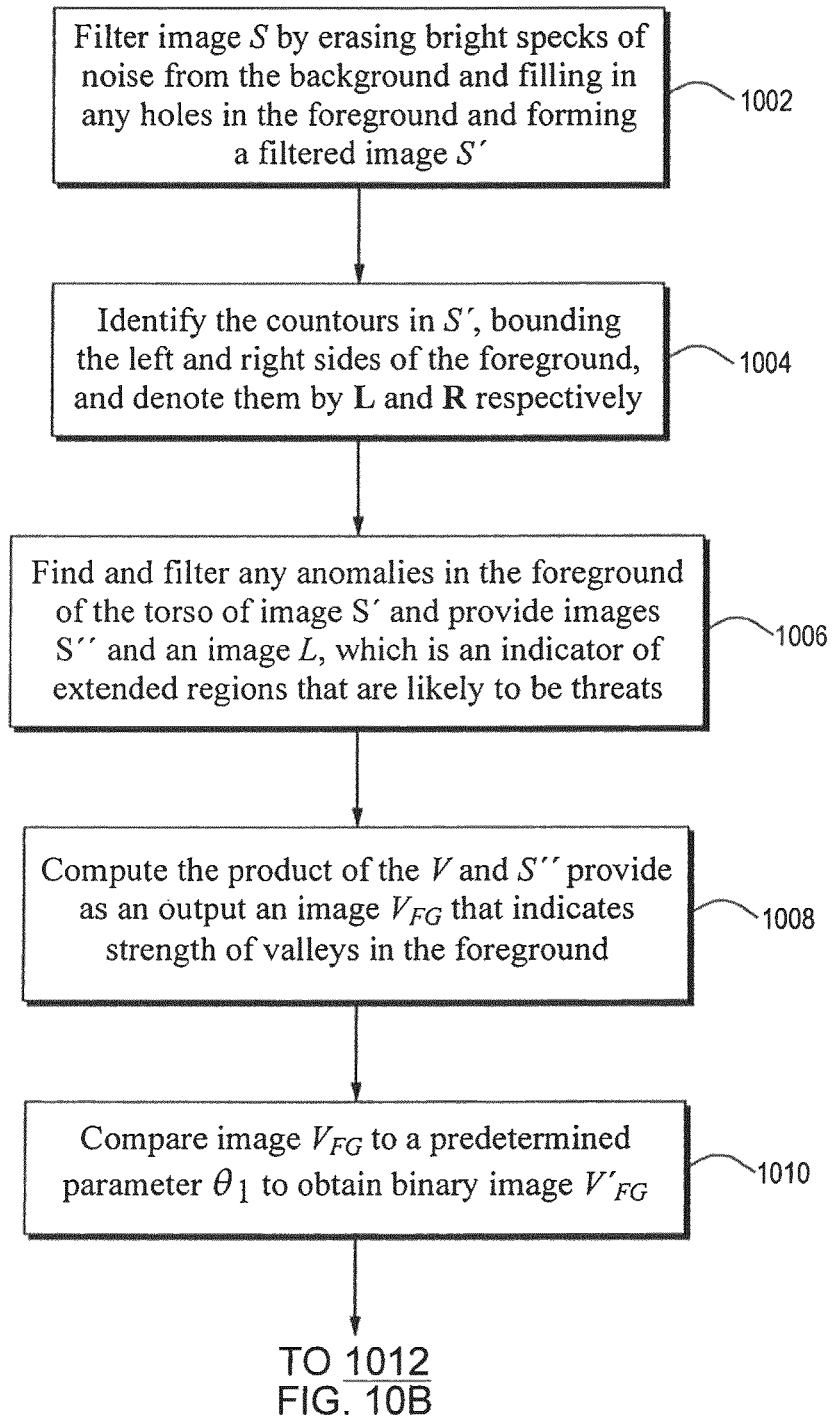
FIGS. 10a-10d depict a flow chart depicting an embodiment of detecting a threat on the torso of a body in accordance with these teachings.
Figure 10B:
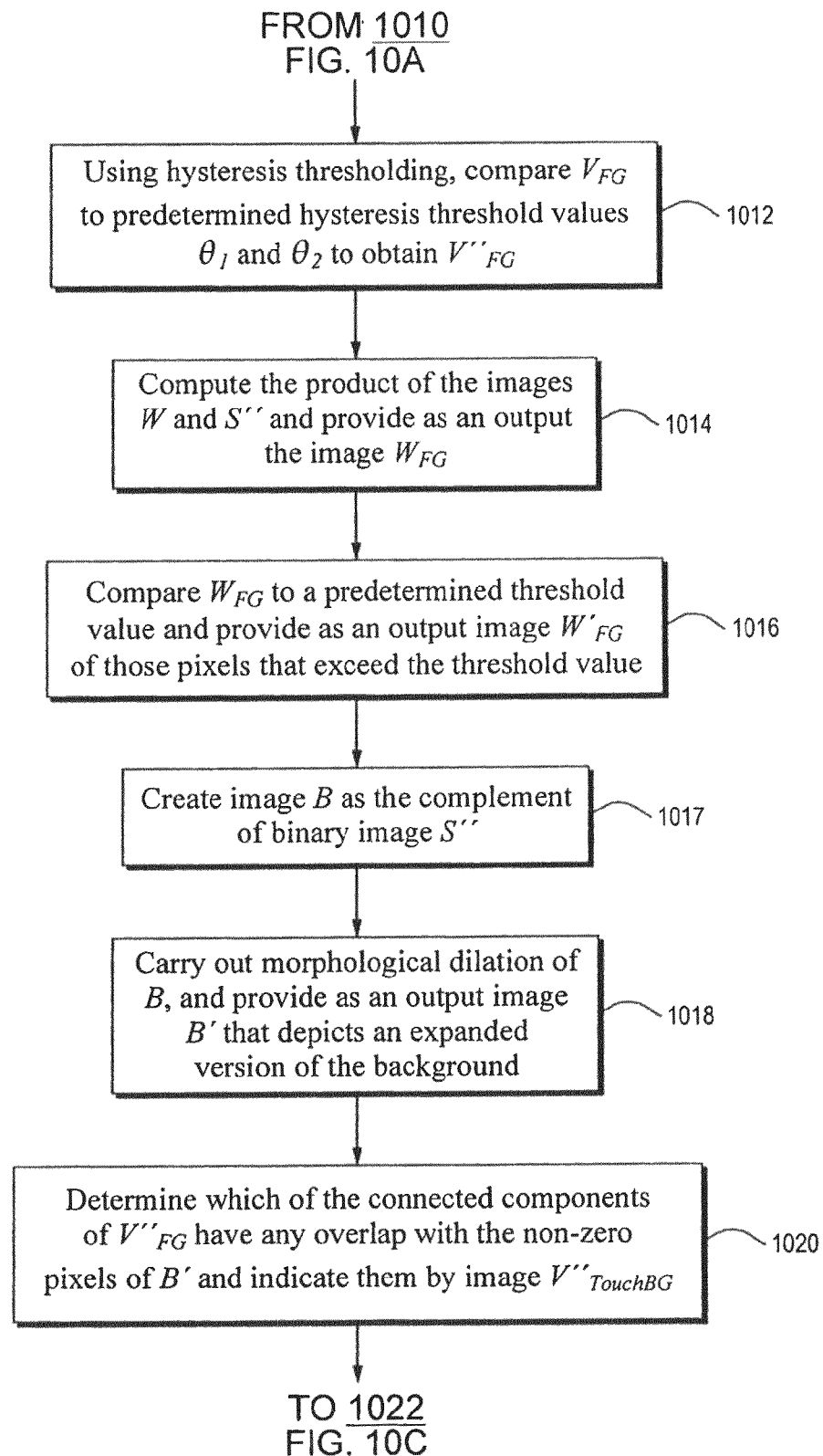
Figure 10C:
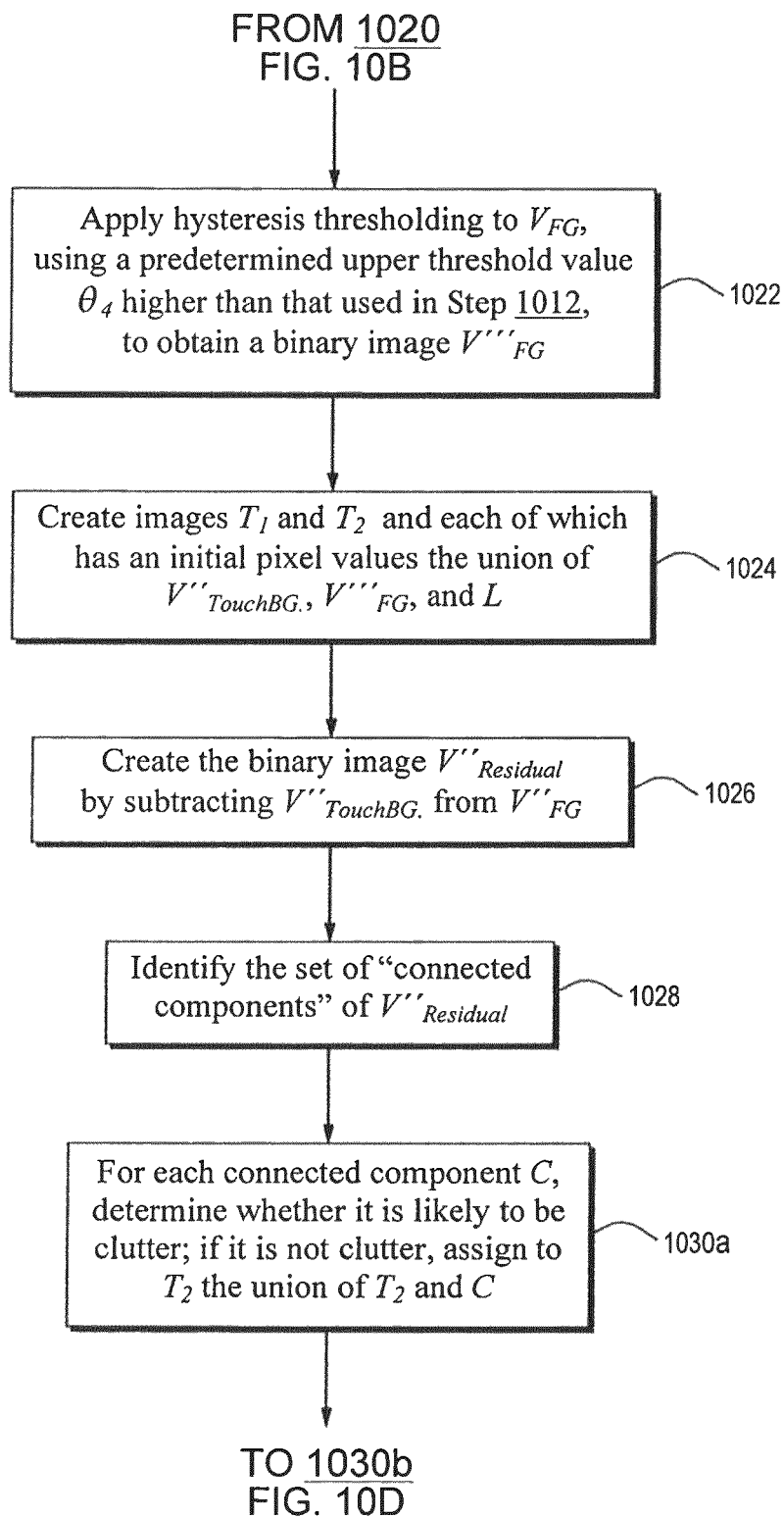
Figure 10D:
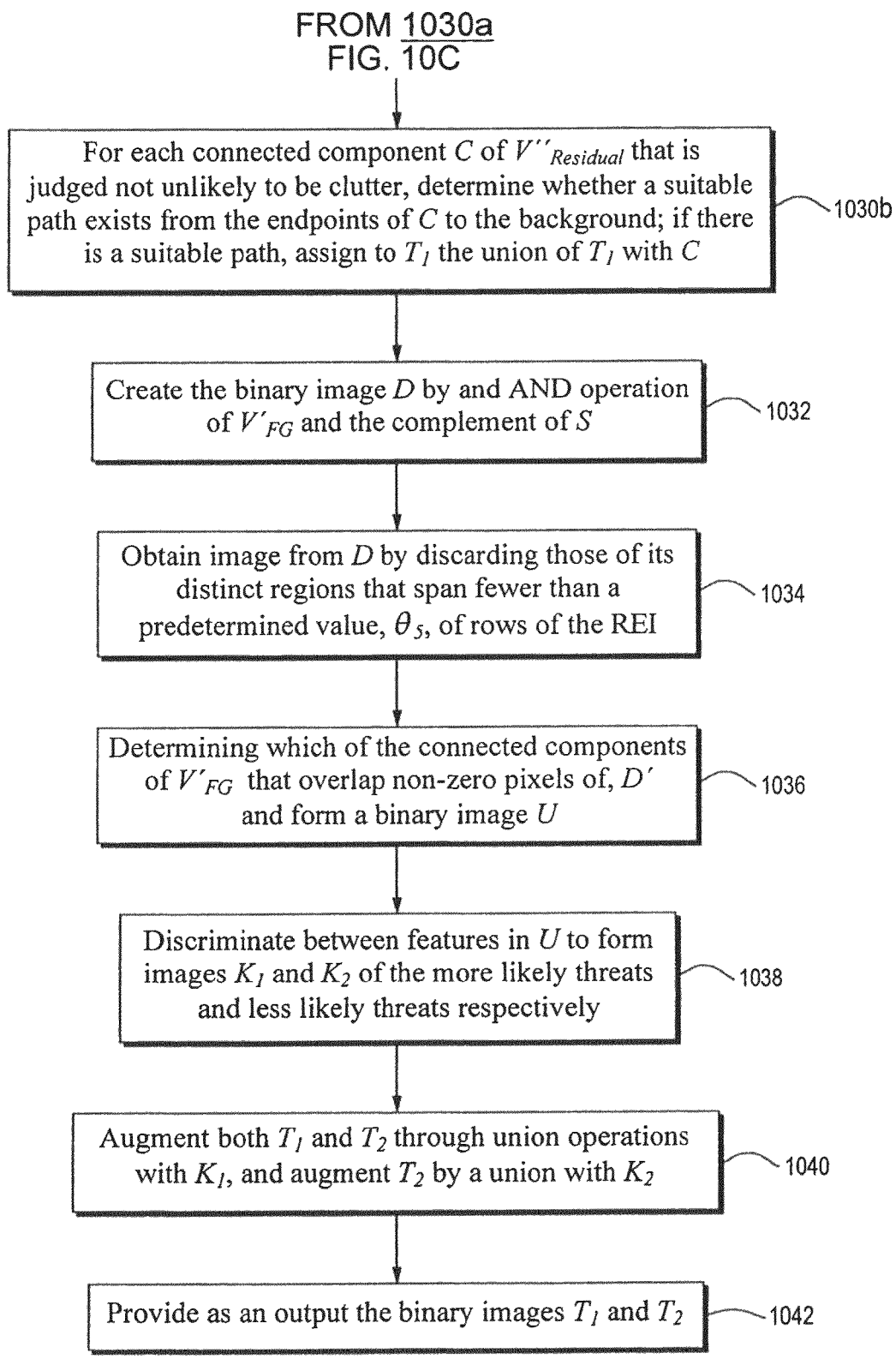
Figure 11A:
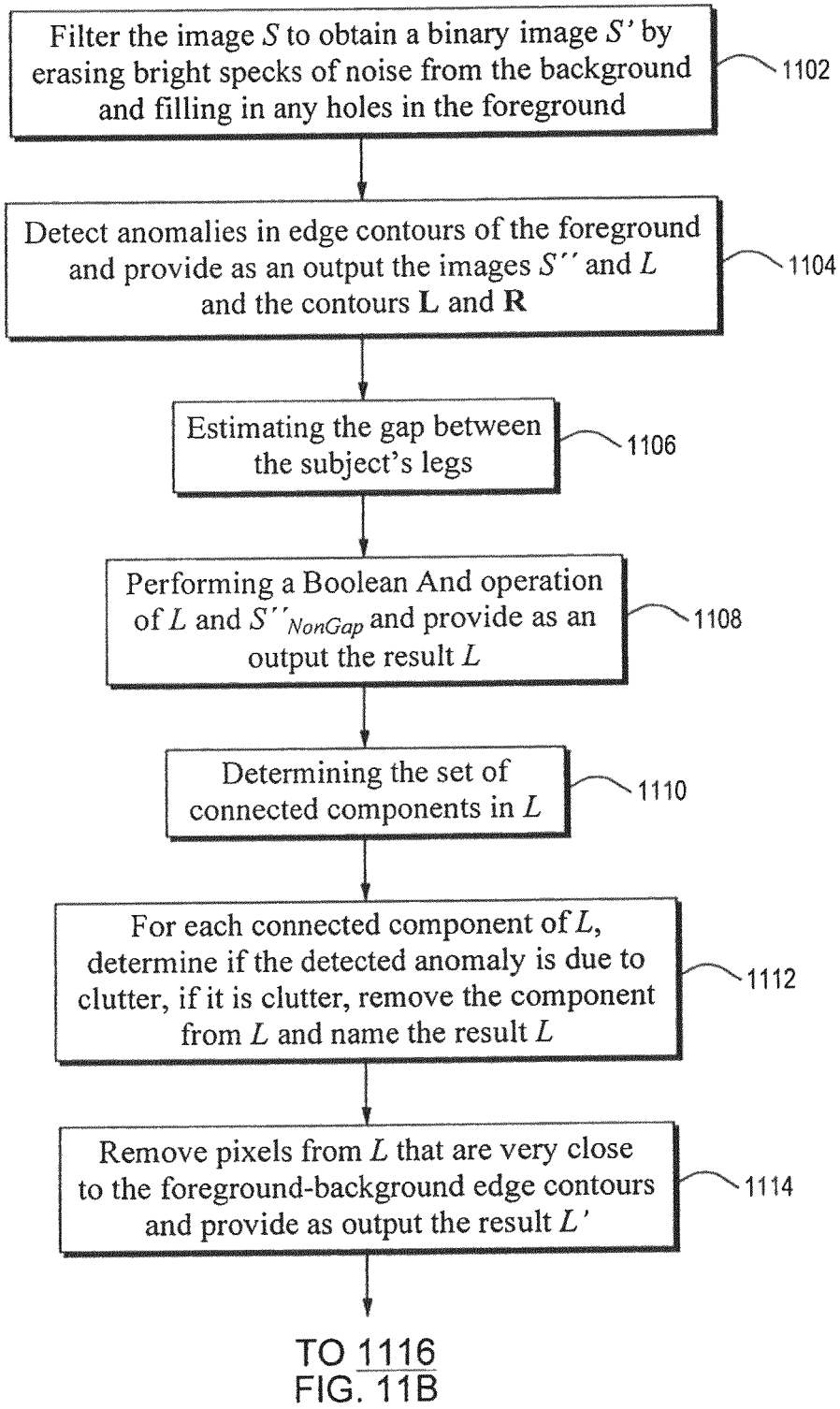
FIGS. 11a-11e depict a flow chart depicting an embodiment of detecting a threat on the legs of a body in accordance with these teachings.
Figure 11B:
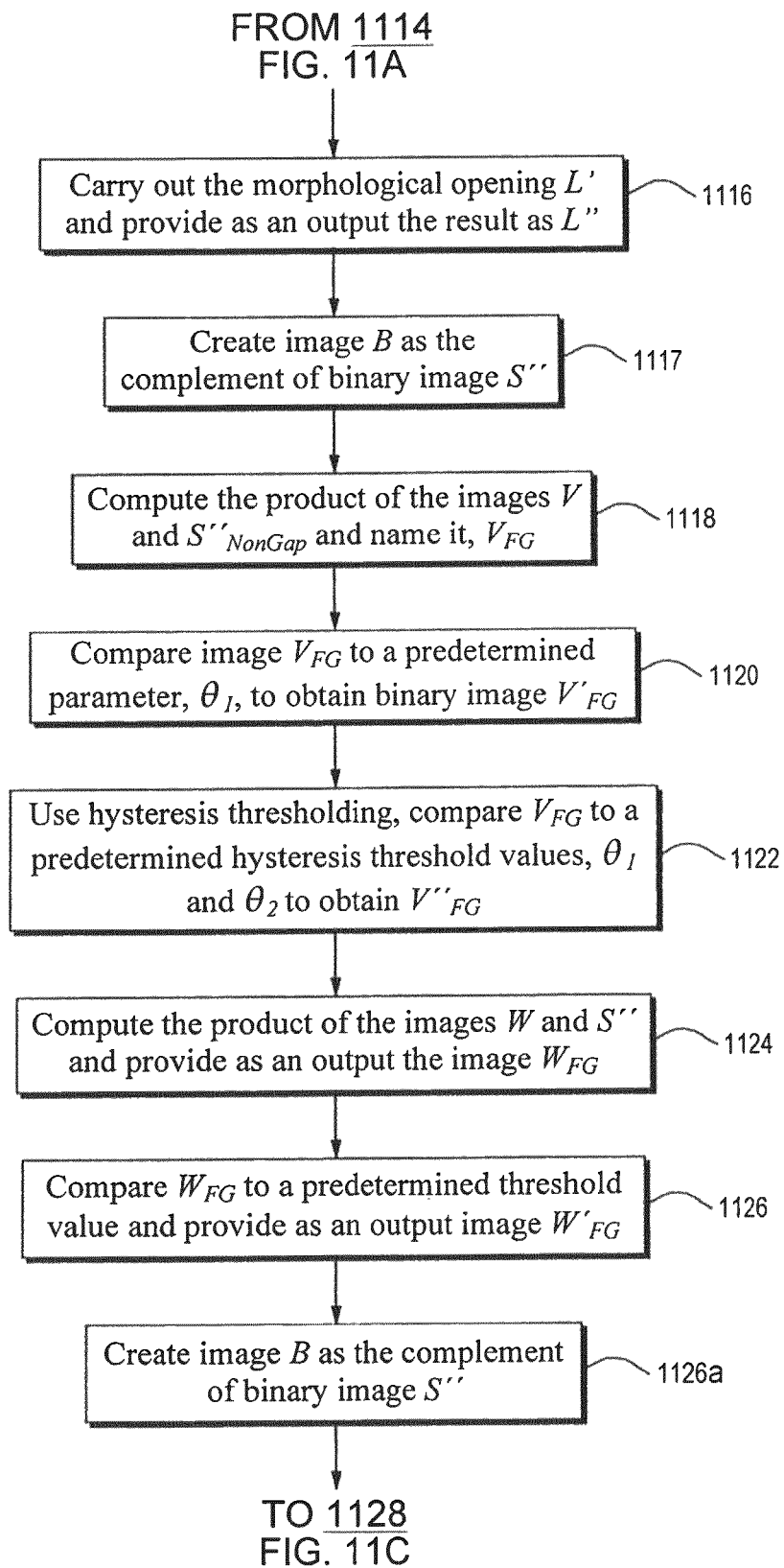
Figure 11C:
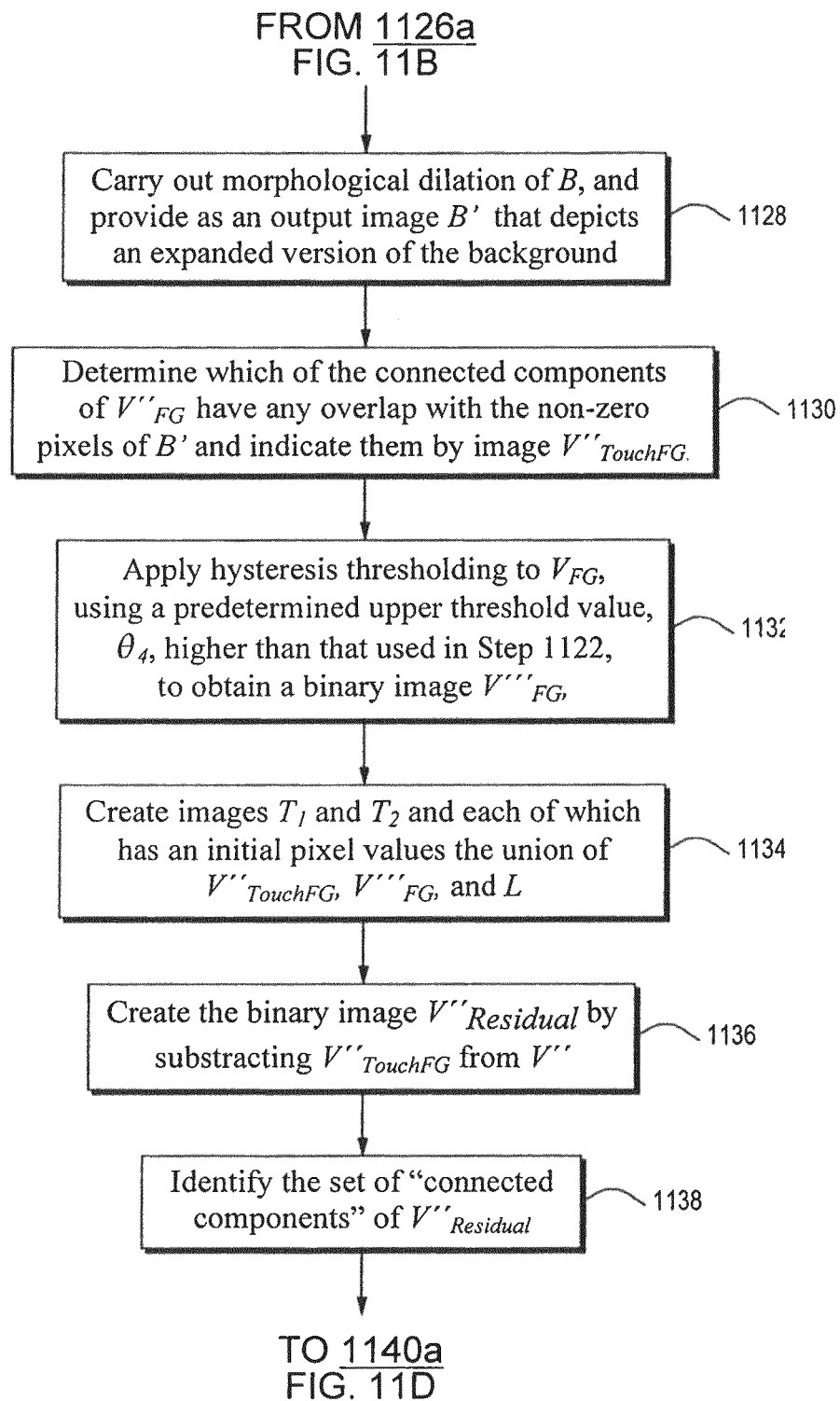
Figure 11D:
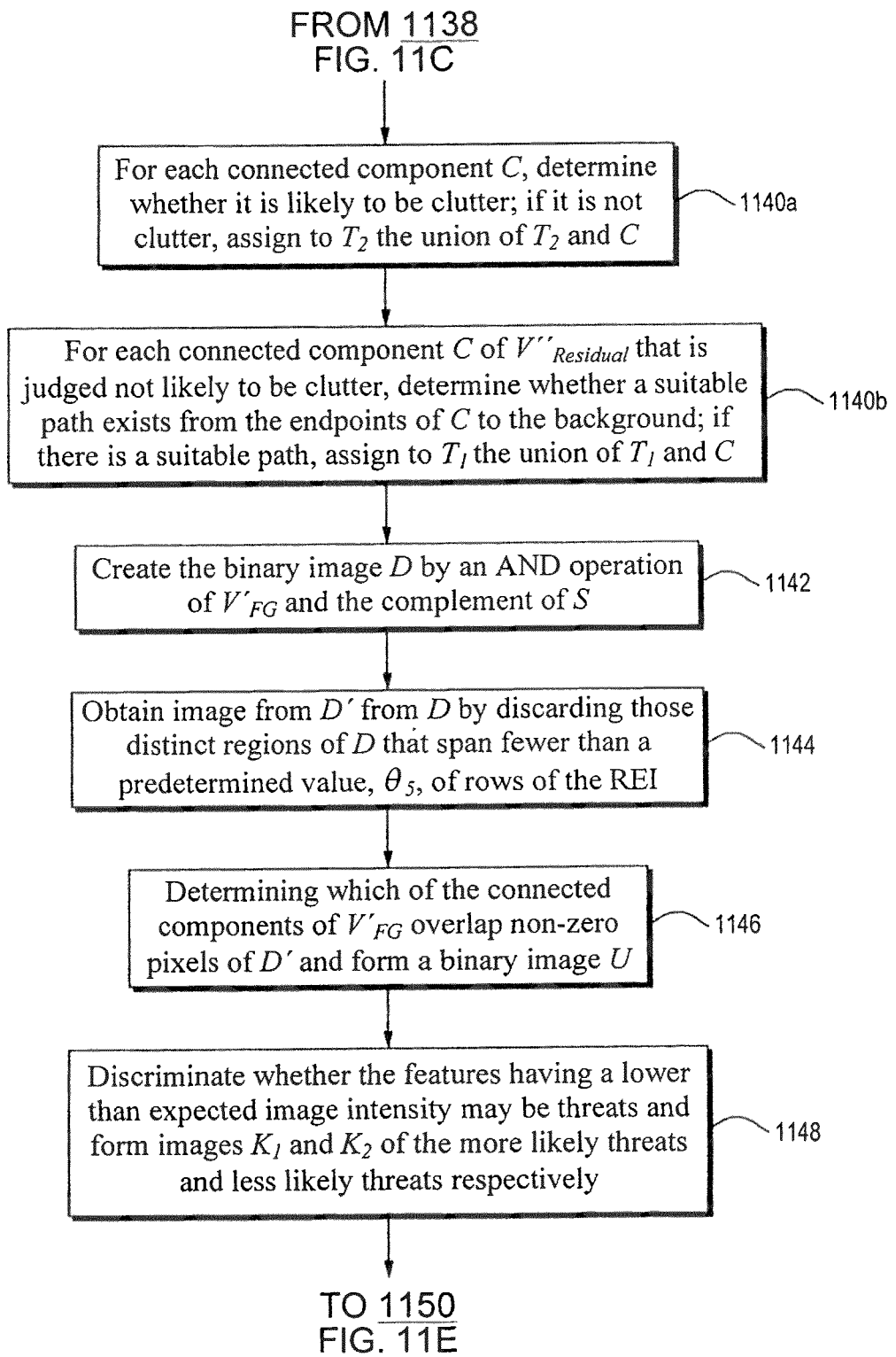
Figure 11E:
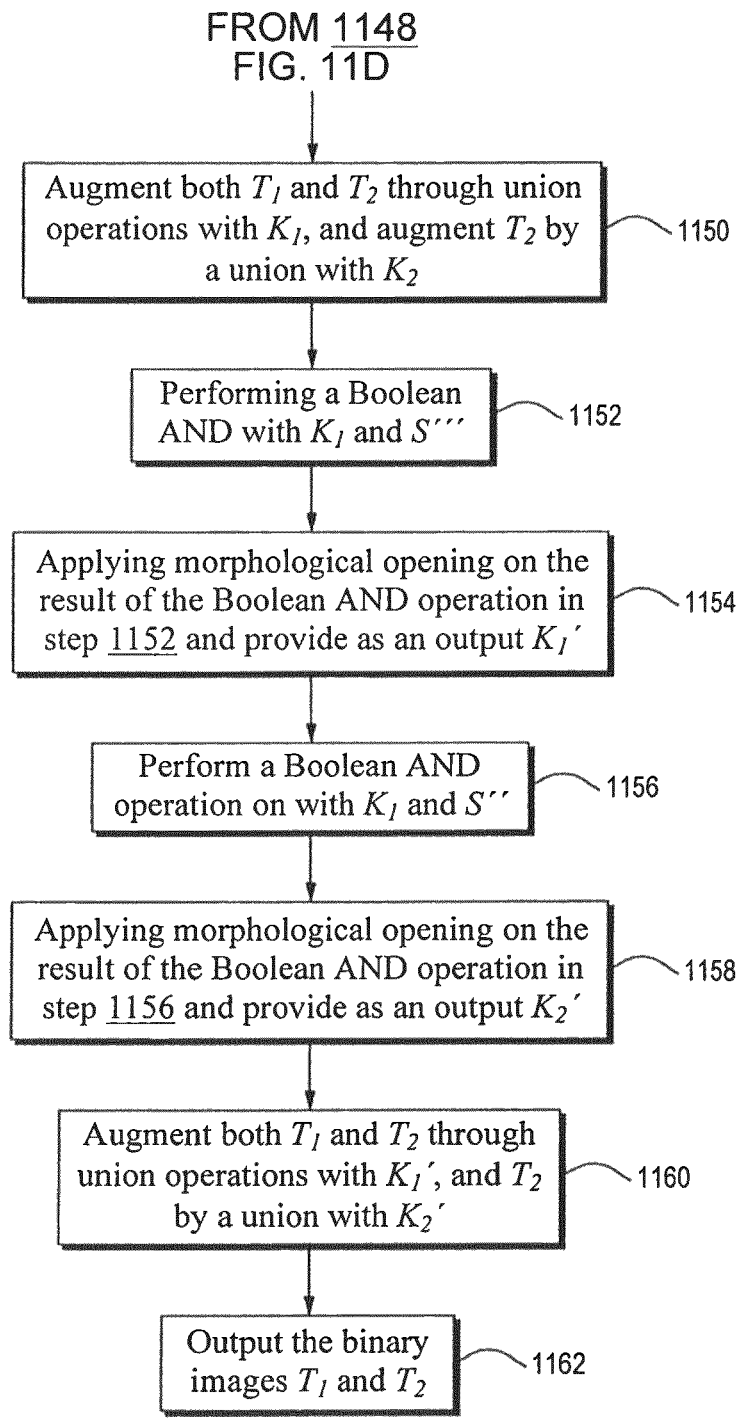

FIG. 9 depicts a method for extracting the valley and ridge edge features from each of the sequence of REIs. The main inputs include the REI R, coefficients of the seven finite impulse response filters $g_{f1}, g_{f2}, g_{f3}, h_{f1}, h_{f2}, h_{f3}, h_{f4}$, calculated for the desired spatial scale and the output includes floating point images V and W of magnitude of valley and ridge edge feature strength. In particular the method includes performing row-wise convolution followed by column-wise convolution of image R with the first and second member respectively of each of the following seven ordered pairs of impulse responses $(g_{f1}, g_{f2})$, $(g_{f3}, g_{f3})$, $(g_{f2}, g_{f1})$, $(h_{f3}, h_{f2})$, $(h_{f4}, h_{f3})$, $(h_{f3}, h_{f4})$, $(h_{f2}, h_{f1})$ and denoting the resulting seven images $G_a, G_b, G_c, H_a, H_b, H_c, H_d$, as depicted in step 902. Combining the images from the previous step to compute the image of dominant local orientation $\theta_d$, as depicted in step 904. Using $\theta_d$ to compute the images $G^{\theta_d}$ and $H^{\theta_d}$, which is the net response of the filters upon being steered to the direction of the dominant local orientation, as depicted in step 906. Combining the images $G^{\theta_d}$ and $H^{\theta_d}$ to obtain the images $E(\theta_d)$ and $\phi$ that convey the oriented energy and local phase of the REI, as depicted in step 908. Calculating the images $\Lambda_{Valleys}$ and $\Lambda_{Ridges}$ of phase preference factors from image $\phi$, as depicted in step 910. Calculating the images V and W of the strengths of valley edge and ridge features as the products of image $E(\theta_d)$ with $\Lambda_{Valleys}$ and $\Lambda_{Ridges}$, respectively, as depicted in step 912.

FIG. 10 depicts a method of threat detection on the torso of a subject. The inputs include the Row Evolution image named R for a row in the on-torso group, images V and W of valley and ridge edge strength in R, binary image S that indicates the foreground areas in R, values of free parameters pertinent to various steps. The output includes binary images $T_1$ and $T_2$ of candidate threat features in the REI R, corresponding to two different levels of likelihood. In particular, the method includes filtering image S by erasing bright specks of noise from the background and filling in any holes in the foreground forming a filtered image S', as depicted in step 1002. Identifying the contours in S', bounding the left and right sides of the foreground, and denote them by L and R respectively, as depicted in step 1004. Finding and filtering any anomalies in the foreground of the torso of image S' and provide images S", which is an improved estimate of the foreground and provide an image L, which is an indicator of extended regions that are likely to be threats, as depicted in step 1006. Computing the product of the V and S" to provide as an output an image $V_{FG}$ that indicates strength of valleys in the foreground, as depicted in step 1008. Comparing image $V_{FG}$ to a predetermined parameter $\theta_1$ to obtain binary image $V'_{FG}$, as depicted in step 1010. Using hysteresis thresholding, comparing $V_{FG}$ to predetermined hysteresis threshold values $\theta_1$ and $\theta_2$ to obtain $V''_{FG}$ which contains those connected components of $V'_{FG}$ at least one of whose pixels has a valley strength that exceeds $\theta_2$, as depicted in step 1012. Computing the product of the images W and S" and providing as an output the image $W_{FG}$ that indicates strength of ridges in the foreground, as depicted in step 1014. Comparing $W_{FG}$ to a predetermined threshold value and providing as an output image $W'_{FG}$ that indicates the significant ridges in the foreground, as depicted in step 1016. Creating image B as the complement of binary image S", as depicted in step 1017. Carrying out morphological dilation of B, and providing as an output image B' that indicates an expanded version of the background, as depicted in step 1018. Determining which of the connected components of $V'''_{FG}$ has any overlap with the non-zero pixels of B' and indicating them by image $V''_{TouchBG}$, as depicted in step 1020. Applying hysteresis thresholding to $V_{FG}$, using a predetermined upper threshold value $\theta_4$ higher than that used in Step 1012, to obtain a binary image $V'''_{FG}$, that is indicative of the location of valleys having strength greater than those indicated by $V''_{FG}$, as depicted in step 1022. Forming images $T_1$ and $T_2$ each of which has as initial pixel values the union of $V''_{TouchBG}$, $V'''_{FG}$, and L, as depicted in step 1024. Creating the binary image $V''_{Residual}$ by subtracting $V''_{TouchBG}$ from $V'''_{FG}$, as depicted in step 1026. Identifying the set of "connected components" of $V''_{Residual}$ which are indicative of distinct valleys, as depicted in step 1028. For each connected component C, determining Whether it is likely to be clutter; if it is not clutter, augmenting $T_2$ with the union of $T_2$ with C, as depicted in step 1030a. For each of those connected components C that are judged not likely to be clutter, determining whether a suitable path exists from the endpoints of C to the background; if there is a suitable path, augmenting $T_1$ by a union with C, as depicted in step 1030b. Creating the binary image D by an AND operation of $V'_{FG}$ and the complement of S, as depicted in step 1032. The image D indicates those pixels in the REI with non-trivial valley strength that possess an image intensity in the original MMW image that is significantly lower than an expected value, and therefore potentially threat like. Forming an image D' from D by discarding those of its distinct regions that span fewer than a predetermined value, $\theta_5$, rows of the REI, as depicted in step 1034. This is equivalent to a feature having a time persistence of less than $\theta_5$ frames in the original MMW image sequence. Determining which of the connected components of $V'_{FG}$ overlap the non-zero pixels of D', and forming a binary image U, as depicted in step 1036. Discriminating whether the features having a lower than expected image intensity conveyed within image U may be threats and forming images $K_1$ and $K_2$ of the more likely threats and less likely threats respectively, as depicted in step 1038. Augmenting both $T_1$ and $T_2$ through union operations with $K_1$, and augmenting $T_2$ by a union with $K_2$, as depicted in step 1040. Providing as an output the binary images $T_1$ and $T_2$, as depicted in step 1042. The images $T_1$ and $T_2$, indicate potential threats that exceed a higher and lower level of threat likelihood respectively.

FIG. 11 depicts a method for detecting potential threats on the subject's leg. The inputs include Row Evolution Image named R for a row in the on-torso group, images V and W of valley and ridge edge strength in R, binary image S that indicates the foreground areas in R and values of free parameters pertinent to various steps. The output includes binary images $T_1$ and $T_2$ of candidate threat features in the REI R, corresponding to two different levels of likelihood. In particular, the method includes filtering the image S to obtain a binary image S' by erasing bright specks of noise from the background and filling in any holes in the foreground, as depicted in step 1102. Detecting anomalies in the foreground and providing as an output the images S" and L, and contours L and R, as depicted in step 1104. Estimating the gap between the subject's legs, as depicted in step 1106. Performing a Boolean And operation of L and $S''_{NonGap}$ and providing as an output the result L, as depicted in step 1108. Determining the set of connected components in L, as depicted in step 1110. For each connected component of L, determining if the detected anomaly is due to clutter; if it is clutter, removing the component from L, and naming the result L, as depicted in step 1112. Removing pixels from L that are very close to the foreground-background edge contours; as depicted in step 1114. This may be accomplished by performing morphological erosion on S" and providing the output as S'" and performing a Boolean And operation of L and S'" and providing as an output the result L'. Carrying out the morphological opening L' and providing as an output the result L", as depicted in step 1116. Computing the product of the images V and $S''_{NonGap}$, and naming it $V_{FG}$, as depicted in step 1118. Comparing image $V_{FG}$ to a predetermined parameter $\theta_1$ to obtain binary image $V'_{FG}$, as depicted in step 1120. Using hysteresis thresholding, comparing $V_{FG}$ to predetermined hysteresis threshold values $\theta_1$ and $\theta_2$ to obtain $V''_{FG}$ which contains those connected components of $V'_{FG}$ at least one of whose pixels has a valley strength that exceeds $\theta_2$, as depicted in step 1122. Computing the product of the images W and S" and providing as an output the image $W_{FG}$ that indicates strength of ridges in the foreground, as depicted in step 1124. Comparing $W_{FG}$ to a predetermined threshold value and providing as an output image $W'_{FG}$ that indicates the significant ridges in the foreground, as depicted in step 1126. Creating image B as the complement of binary image S", as depicted in step 1126a Carrying out morphological dilation of B, and providing as an output image B' that depicts an expanded version of the background, as depicted in step 1128. Determining which of the connected components of $V''_{FG}$ have any overlap with the non-zero pixels of B' and indicating them by image $V''_{TouchBG}$, as depicted in step 1130. Applying hysteresis thresholding to $V_{FG}$, using a predetermined upper threshold value $\theta_4$ higher than that used in Step 1122, to obtain a binary image $V'''_{FG}$, that is indicative of the location of valleys having strength greater than those indicated by $V''_{FG}$, as depicted in step 1132. Creating images $T_1$ and $T_2$ each of which has an initial pixel values the union of $V''_{TouchBG}$, $V'''_{FG}$, and L, as depicted in step 1134. Creating the binary image $V''_{Residual}$ by subtracting $V''_{TouchBG}$ from $V'''_{FG}$, as depicted in step 1136. Identifying the set of "connected components" of $V''_{Residual}$ which are indicative of distinct valleys, as depicted in step 1138. For each connected component C, determining whether it is likely to be clutter; if it is not clutter, augmenting $T_2$ with the union of $T_2$ with C, as depicted in step 1140a. For each of those connected components C that are judged not likely to be clutter, determining whether a suitable path exists from the endpoints of C to the background; if there is a suitable path, augmenting $T_1$ with the union of C, as depicted in step 1140b. Creating the binary image D by an AND operation of $V'_{FG}$ and the complement of S, as depicted in step 1142. The image D indicates those pixels in the REI having non-trivial valley strength that possess an image intensity in the original MMW image that is significantly lower than an expected value, and therefore potentially threat like. Forming image D' from D by discarding those of its distinct regions that span fewer than a predetermined number, $\theta_5$, of rows of the REI, as depicted in step 1144. This is equivalent to a feature having a time persistence of less than $\theta_5$, frames in the original MMW image sequence. Determining which of the connected components of $V'_{FG}$ overlap the non-zero pixels of D', and forming a binary image U, as depicted in step 1146. Discriminating whether the features having a lower than expected image intensity may be threats and forming images $K_1$ and $K_2$ of the more likely threats and less likely threats respectively, as depicted in step 1148. Augmenting both $T_1$ and $T_2$ through union operations with $K_1$, and augmenting $T_2$ by a union with $K_2$, as depicted in step 1150. Performing a Boolean AND with $K_1$ and S'", as depicted in step 1152 and then applying morphological opening on the result and providing as an output $K'_1$; as depicted in step 1154. Performing a Boolean AND operation on $K_2$ with S", as depicted in step 1156 and then applying morphological opening on the result and providing as an output the result $K'_2$, as depicted in step 1158. Augmenting both $T_1$ and $T_2$ through union operations with $K'_1$, and $T_2$ by a union with $K'_2$, as depicted in step 1160. Providing as an output the binary images $T_1$ and $T_2$ which indicate candidate exceeding a higher and lower level of threat likelihood respectively, as depicted in step 1162.

Figure 12A:
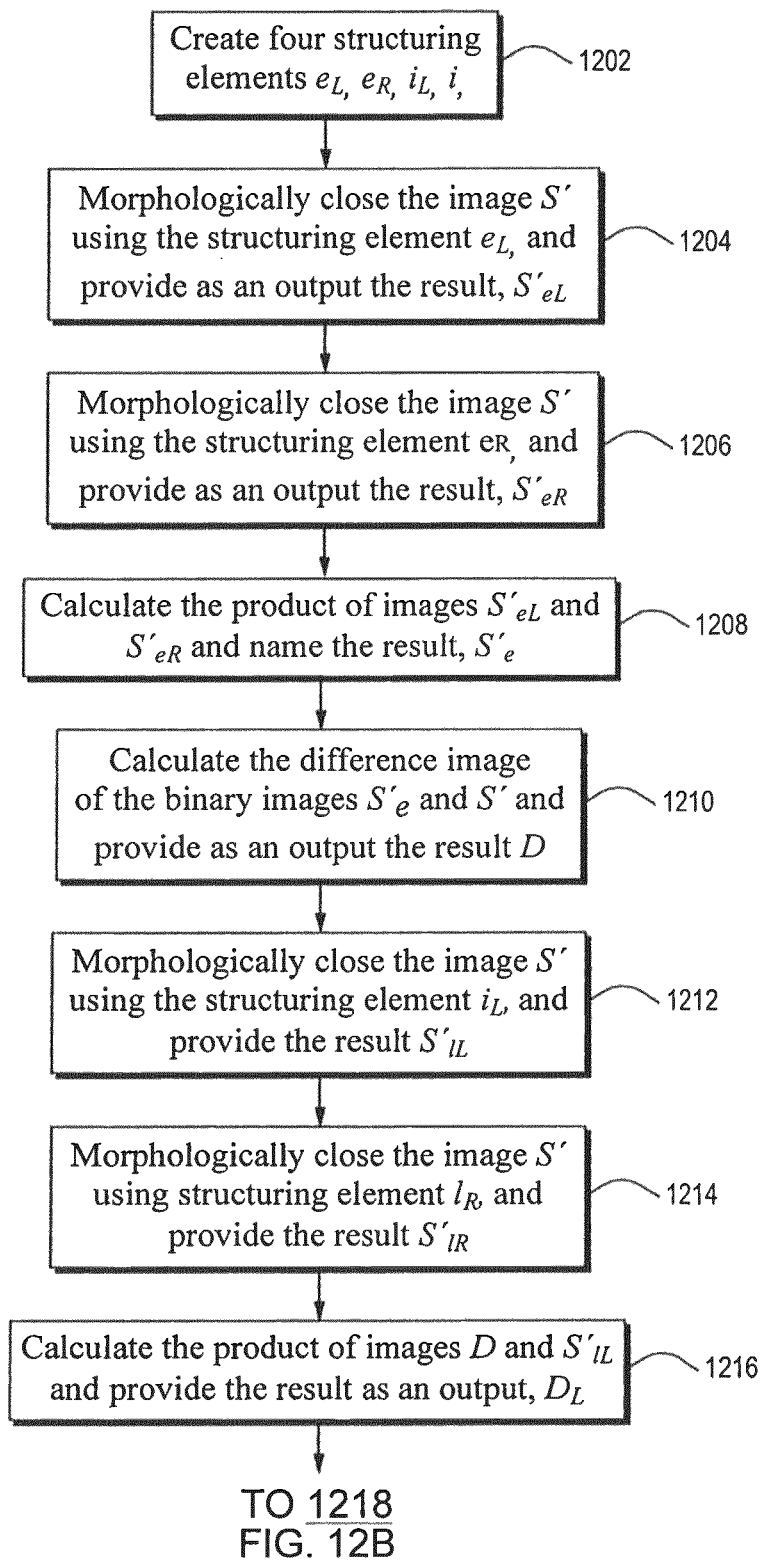
FIGS. 12a-12b depict a flow chart depicting an embodiment of distinguishing anomalies in the foreground of a torso REI in accordance with these teachings.
Figure 12B:
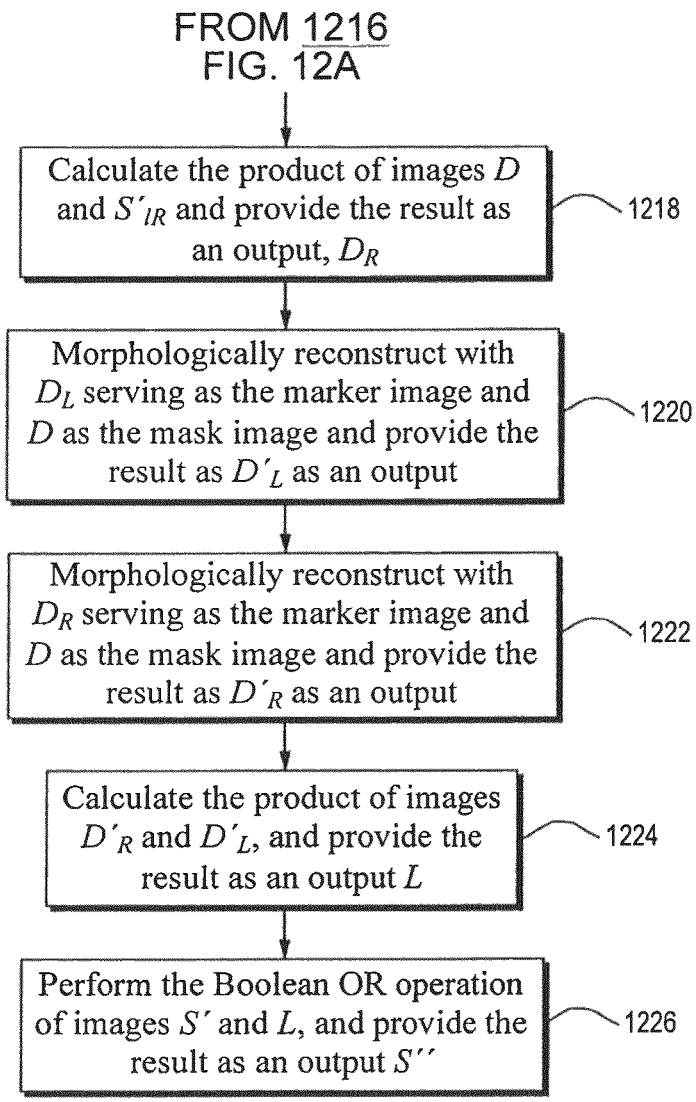
Figure 18A:
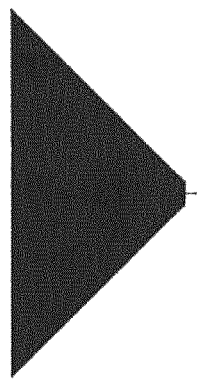
FIGS. 18a-18b conceptually illustrate structuring elements in accordance with the disclosure.

FIG. 12 depicts a method for finding anomalies in the foreground of the torso of a subject. The inputs include binary valued image S' of a segmented REI and values of free parameters pertinent to various steps. The output includes image S" (segmented REI after augmentation) and image L of likely threat regions. In particular, the method includes forming four structuring elements, as depicted in step 1202. This step should be performed once for a given image sequence. In one embodiment, a structuring element $e_L$ depicted in FIG. 18A has an image footprint shaped roughly like a right isosceles triangle with the two equal sides flaring symmetrically towards the upper left and lower left. The fine detail close to the element's center consists of a thin one-pixel high horizontal segment. The width of the image footprint of $e_L$ should exceed the width of S'. See FIG. 18*a*.

Figure 18B:
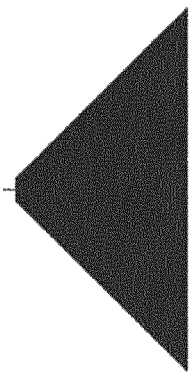

Structuring element $e_R$ depicted in FIG. 18*b* has an image footprint shaped like a right isosceles triangle with the two equal sides flaring symmetrically towards the upper right and lower right. The fine detail close to the element's center consists of a thin one-pixel high horizontal segment. The width of the image footprint of $e_R$ should exceed the width of S'. See FIG. 18*a*.

Structuring element $l_L$ depicted in FIG. 19*a* has an image footprint shaped like a horizontal line segment extending leftwards from the origin, and of width exceeding the width of S'. See FIG. 19*a*.

Structuring element $l_R$ depicted in FIG. 19*b* has an image footprint shaped like a horizontal line segment extending rightwards from the origin, and of width exceeding the width of S'. See FIG. 19*b*.

The method for finding anomalies in the foreground of the torso of a subject further includes morphologically closing the image S' using the structuring element $e_L$, and providing as an output the result $S'_{eL}$, as depicted in step 1204. Carrying out the morphological closing of image S' with the structuring element $e_R$, and name the result $S'_{eR}$ as depicted in step 1206. Calculating the product of images $S'_{eL}$ and $S'_{eR}$ and providing the result $S'_e$, as depicted in step 1208. Calculating the difference image of the binary images $S'_e$ and S', and providing as an output the result D, as depicted in step 1210. Morphologically closing the image S' using the structuring element $l_L$, and providing the result $S'_{lL}$ as an output, as depicted in step 1212. Morphologically closing image S' using structuring element $l_R$, and providing the result $S'_{lR}$ as an output, as depicted in step 1214. Calculating the product of images D and $S'_{lL}$ and providing the result $D_L$ as an output, as depicted in step 1216. Calculating the product of images D and $S'_{lR}$ and providing the result $D_R$ as an output, as depicted in step 1218. Morphologically reconstructing with $D_L$ serving as the marker image and D as the mask image and providing the result $D'_L$ as an output as depicted in step 1220. Morphologically reconstructing with $D_R$ serving as the marker image and D as the mask image and providing the result $D'_R$ as an output, as depicted in step 1222. Calculating the product of images $D'_L$ and $D'_R$, and providing the result L as an output, as depicted in step 1224. Performing the Boolean OR operation of images S' and L, and providing the result S" as an output, as depicted in step 1226.

Figure 13A:
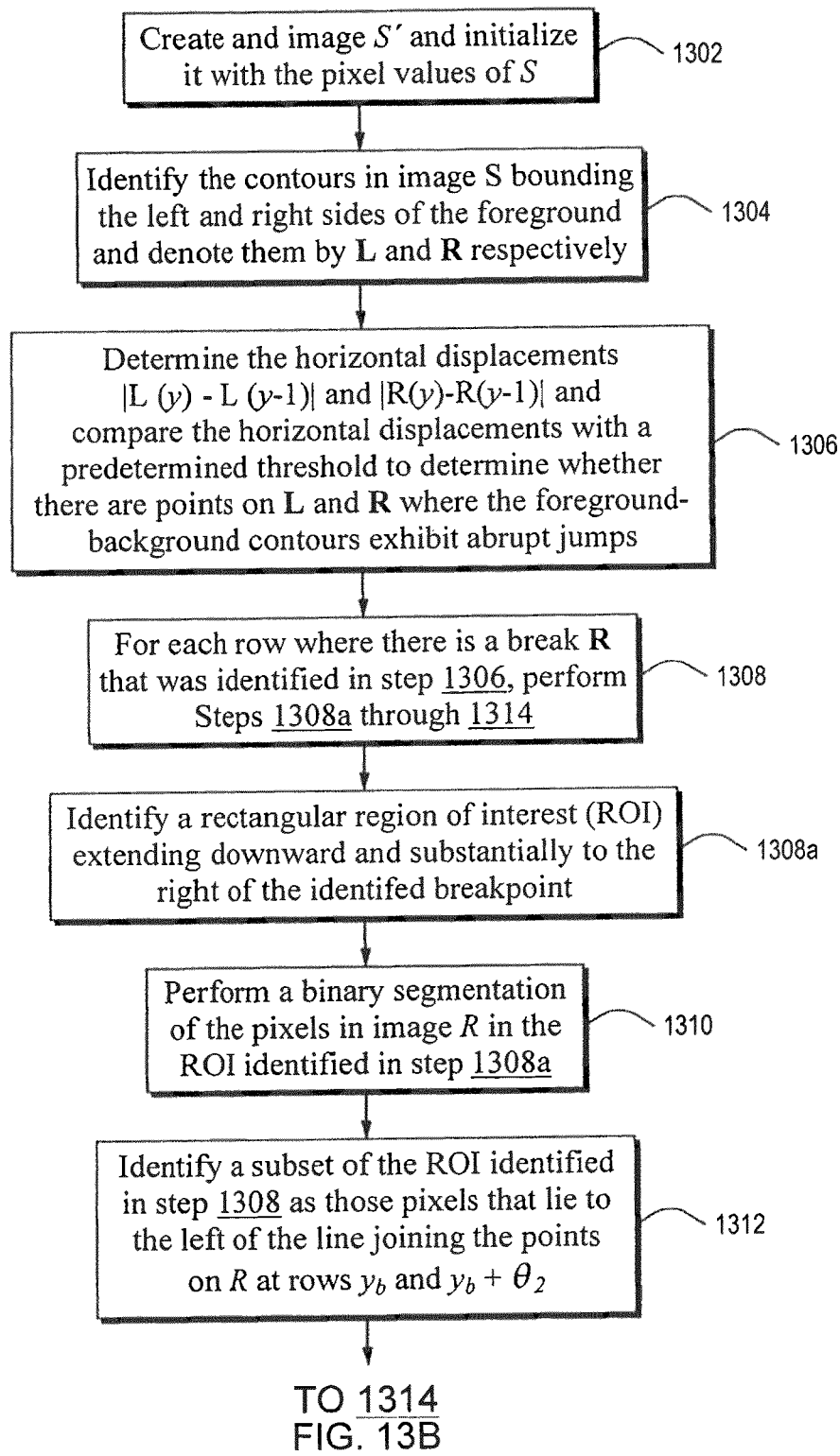
FIGS. 13a-13b depict a flow chart depicting an embodiment of distinguishing anomalies in the foreground edges of a leg REI in accordance with these teachings.
Figure 13B:
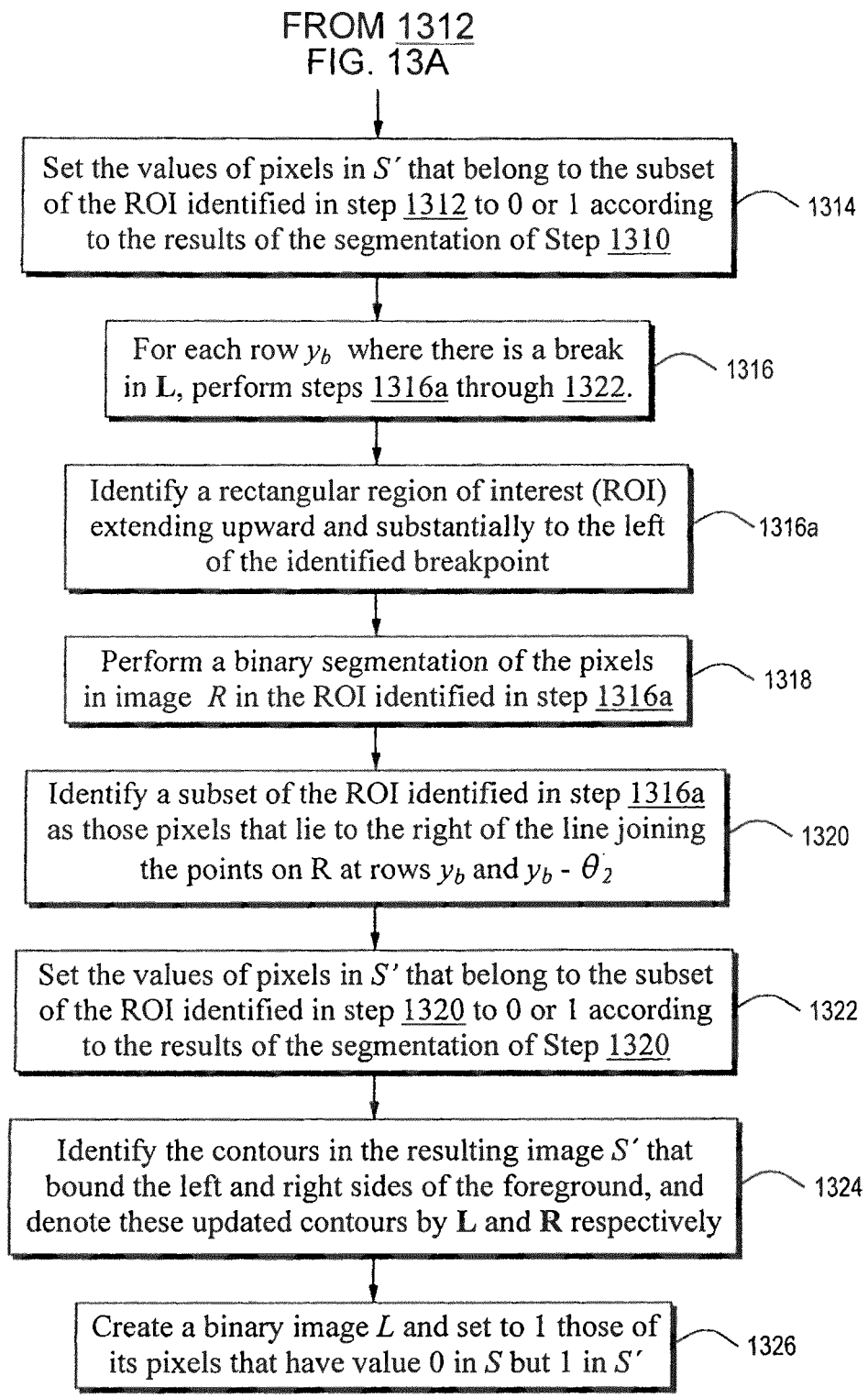

FIG. 13 provides a method for identifying anomalies on the foreground edges of the legs of a subject. The inputs include REI R, Binary valued image S of a segmented REI, and the values of free parameters pertinent to various steps. The outputs include Image S' (segmented REI after augmentation), image L of tentative threat regions, foreground-background edge contours L and R bounding the left and right sides of the foreground respectively. In particular the method includes, creating an image S' and initializing the pixel values with the corresponding pixel values of image S, as depicted in step 1302. Identifying the contours in image S bounding the left and right sides of the foreground and denote them by L and R respectively, as depicted in step 1304. Determining the horizontal displacements $|L(y)-L(y-1)|$ and $|R(y)-R(y-1)|$ and comparing the horizontal displacements to a predetermined threshold $\theta_1$ to determine whether there are points on L and R where the foreground-background contours exhibit abrupt jumps, as depicted in step 1306. For each row $y_b$ where there is a break in R that was identified in step 1306, performing steps 1308*a* through 1314 as depicted in step 1308. In each row exhibiting a break, identifying a rectangular region of interest (ROI) extending downward and substantially to the right of the identified breakpoint, as depicted in step 1308*a*, where the vertical expanse of the ROI is height $\theta_2$ pixels from row $y_b$ downwards and the horizontal expanse of the ROI is from the leftmost point attained by the section of the contour R between rows $y_b$ and $y_b+\theta_2$ up to the right border of row evolution image R. Performing a binary segmentation of the pixels in image R in the ROI identified in step 1308, as depicted in step 1310. Identifying a subset of the ROI identified in step 1308 as those pixels that lie to the left of the line joining the points on R at rows $y_b$ and $y_b+\theta_2$, as depicted in step 1312. Setting the values of pixels in S' that belong to the subset of the ROI identified in step 1312 to 0 or 1 according to the results of the segmentation of Step 1310, as depicted in step 1314. For each row $y_b$ where there is a break in L, performing steps 1316*a* through 1322, as depicted in step 1316. Identifying a rectangular region of interest (ROI) extending upward and mostly to the left of the breakpoint, as depicted in step 1316*a*, where the vertical expanse of the ROI is height $\theta_2$ pixels from row $y_b$ upwards and where the horizontal expanse of the ROI is from the leftmost point attained by the section of the contour L between rows $y_b-\theta_2$ and $y_b$ up to the left border of image R. Performing a binary segmentation of the pixels of R in the ROI of Step 1316*a*, as depicted in step 1318. Identifying a subset of the ROI of step 1316*a* consisting of pixels that lie to the right of the line joining the points on L at rows $y_b-\theta_2$ and $y_b$, as depicted in step 1320. Setting the values of pixels S' that belong to the subset of the ROI in the previous step to 0 or 1 according to the results of the segmentation of step 1318, as depicted in step 1322. Identifying the contours in the resulting image S' that bound the left and right sides of the foreground, and denote these updated contours by L and R respectively, as depicted in step 1324. Creating a binary image L and set to 1 those of its pixels that have value 0 in S but 1 in S', as depicted in step 1326. The pixels in image L are those pixels that are likely to be among those pixels that are indicative of threats.

Figure 14:
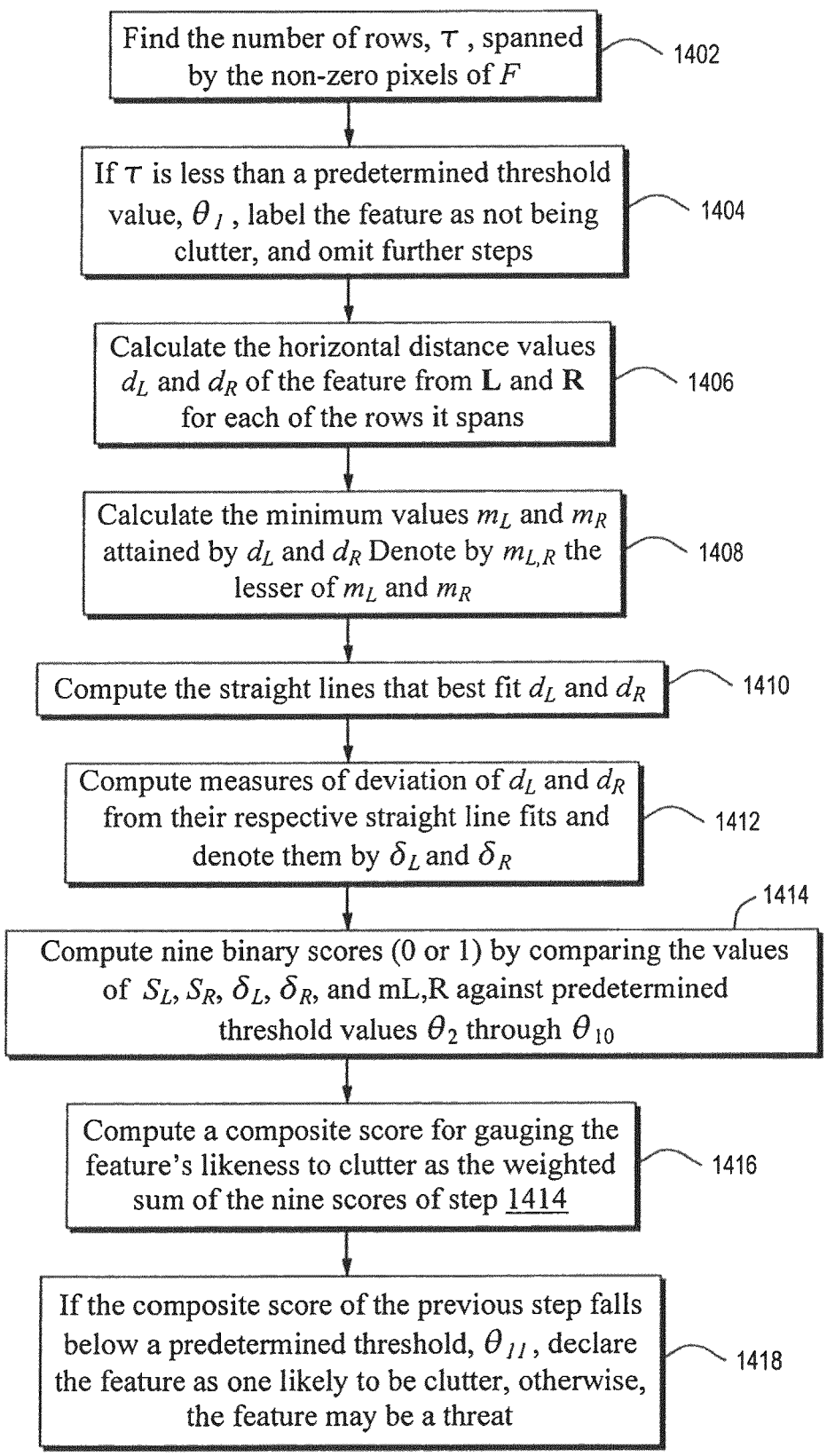
FIG. 14 depicts a flow chart depicting an embodiment of detecting and distinguishing clutter in accordance with these teachings.

FIG. 14 depicts a method of discriminating threats from clutter. The inputs include binary valued image F of a single feature (such as a valley edge) from an REI, foreground-background edge contours L and R, and the values of various free parameters. The output includes a Boolean value indicating whether the feature should be regarded as clutter. In particular, the method includes finding the number of rows spanned by the non-zero pixels of F, $\tau$, as depicted in step 1402. This is indicative of the feature's time persistence, $\tau$, i.e., the number of frames the feature appears in the original MMW sequence. Comparing $\tau$ to a predetermined threshold value $\theta_1$, and in the event that $\tau$ is greater than the predetermined threshold value label the feature as not being clutter, and omit further steps, as depicted in step 1404. Calculating the horizontal distance values $d_L$ and $d_R$ of the feature from L and R for each of the $\tau$ rows it spans, as depicted in step 1406. Calculating the minimum values $m_L$ and attained by $d_L$ and $d_R$. Forming $m_{L,R}$ as the lesser of $m_L$ and $m_R$, as depicted in step 1408. Computing the straight lines that best fit $d_L$ and $d_R$ when regarded as functions of the row index and where $s_L$ and $s_R$ represent the slopes of the respective lines, as depicted in step 1410. Computing measures of deviation of $d_L$ and $d_R$ from their respective straight line fits and denoting them by $\delta_L$ and $\delta_R$, as depicted in step 1412. The deviation $\delta_L$ is measured as the maximum of the absolute values of the point-wise differences between and its best fitting line. Similarly, the deviation $\delta_R$ is measured as the maximum of the absolute values of the point-wise differences between $d_R$ and its best fitting line. Computing nine binary scores (0 or 1) by comparing the values of $s_L$, $s_R$, $\delta_L$, $\delta_R$, and $m_{L,R}$ against predetermined threshold values $\theta_2$ through $\theta_{10}$, as depicted in step 1414. Computing a composite score for evaluating the feature's likeness to clutter as the weighted sum of the nine scores of step 1414, as depicted in step 1416. In general, the weights are positive for the binary scores indicating the values of $|s_L|$ and $|s_R|$ to be high, negative for the binary scores showing $|s_L|$ and $|s_R|$ to be low, positive for ones showing $\delta_L$ and $\delta_R$ to be low, and positive for the ones showing $m_{L,R}$ to be low. Comparing the computed composite score to a predetermined threshold $\theta_{11}$, and if the composite score of the previous step is less than the threshold value, declaring the feature as one likely to be clutter, as depicted in step 1418.

Figure 15:
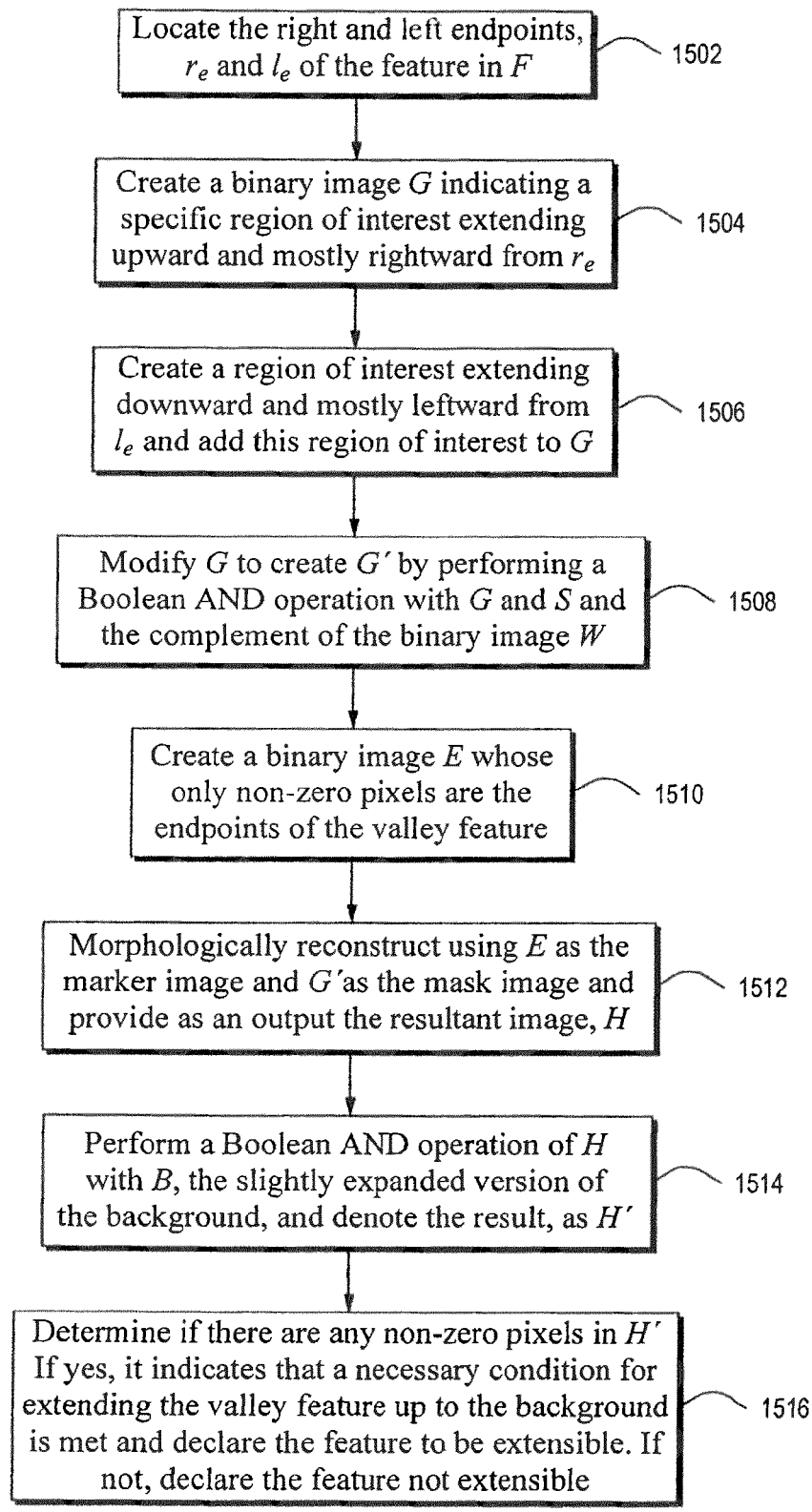
FIG. 15 depicts a flow chart depicting an embodiment of estimating the extensibility of a trajectory of a feature in accordance with these teachings.

FIG. 15 depicts a method to find the extensibility of a feature. The inputs include binary valued image F of a single feature (such as a valley edge) from an REI, binary image S of a segmented REI, binary image B indicating a slightly expanded version of the background area of the REI, binary image W indicating significant ridges in the foreground, foreground-background edge contours L and R and values of free parameters. The output includes a Boolean indication (yes or no) of whether the valley feature is suitably extensible. In particular, the method includes locating the right and left endpoints $r_e$ and $l_e$ of the feature in F, as depicted in step 1502. Creating a binary image G indicating a specific region of interest extending upward and mostly rightward from $r_e$, as depicted in step 1504. In general, the specific region is determined by beginning with a rectangle shaped region of interest with $r_e$ as its bottom left vertex, height given by a predetermined value $\theta_1$, and width extending from $r_e$ to the right border of the REI and abut to the left side of the above rectangular area a wedge shaped zone flaring out from $r_e$ in an upward and leftward orientation. Setting the leftmost vertex of this wedge shaped augmentation by an amount reasonable for accommodating the horizontal undulation typically exhibited by the foreground sides: one-fourth of the width of the foreground at the leftmost point of R in the interval of $\theta_1$ rows above $r_e$. Creating another region of interest similar to the one in step 1504, extending downward and mostly leftward from $l_e$ and adding this region of interest to G, as depicted in step 1506. Modifying G to form G' by performing a Boolean AND operation with G and S and the complement of the binary image W, as depicted in step 1508. The non-zero pixels of G' are restricted to the foreground, excluding any pixels that exhibit significant ridge strength. Forming a binary image E whose only non-zero pixels are the endpoints of the valley feature, as depicted in step 1510. Morphologically reconstructing using F as the marker image and G' as the mask image and provide as an output the resultant image, denoted H, as depicted in step 1512. In general, the image H indicates those foreground pixels in a suitable vicinity of the feature's endpoints to which a connecting path can be setup without interruption by a significant ridge. Performing a Boolean AND operation of H with B, the slightly expanded version of the background, and denoting the result H', as depicted in step 1514. Determining if there are any non-zero pixels H'. If yes, inferring that a necessary condition for extending the valley feature up to the background is met and declaring the feature to be extensible. If not, declaring the feature not extensible, as depicted in step 1516.

Figure 16A:
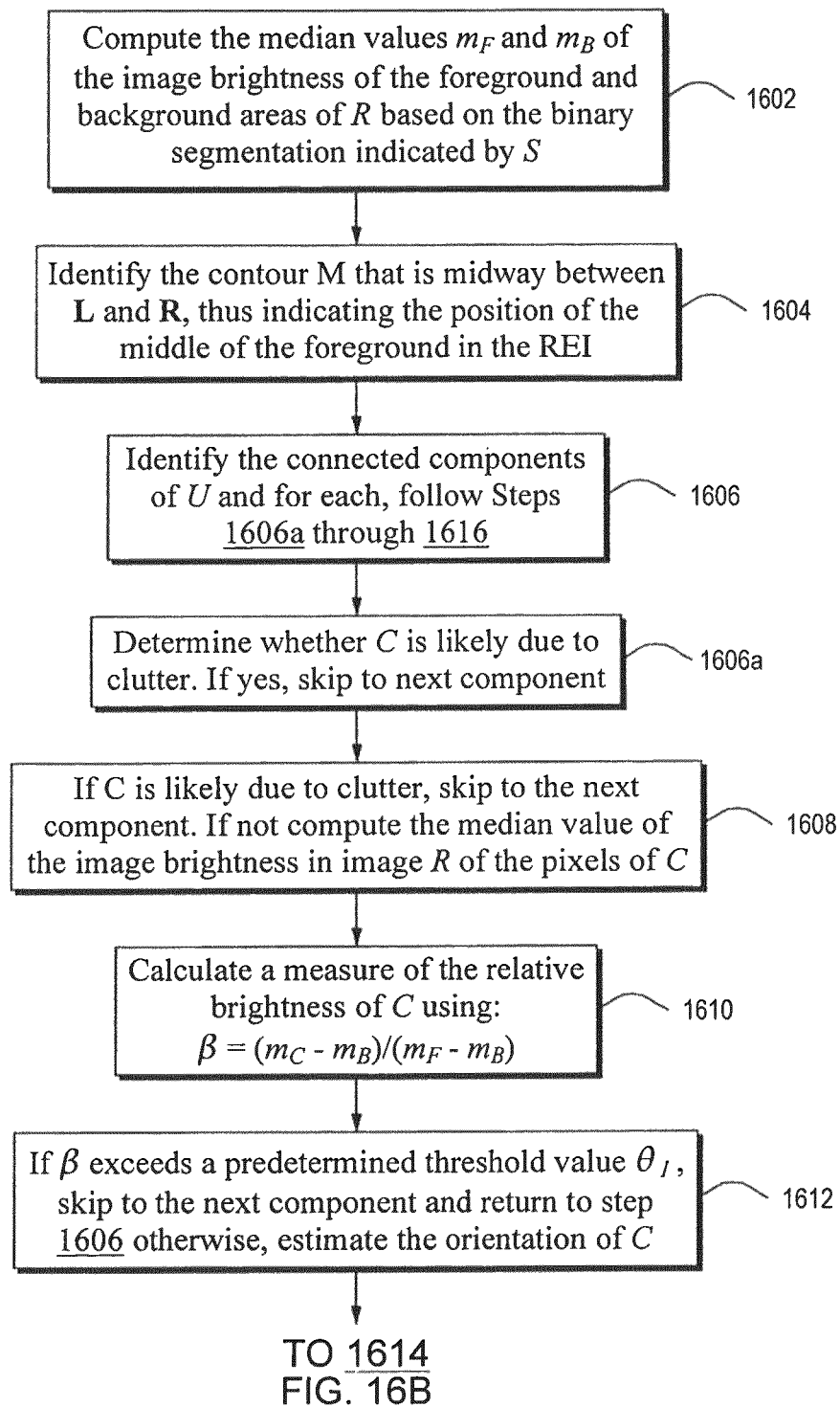
FIGS. 16a-16b depict a flow chart depicting an embodiment of distinguishing between potential threat features in accordance with these teachings.
Figure 16B:
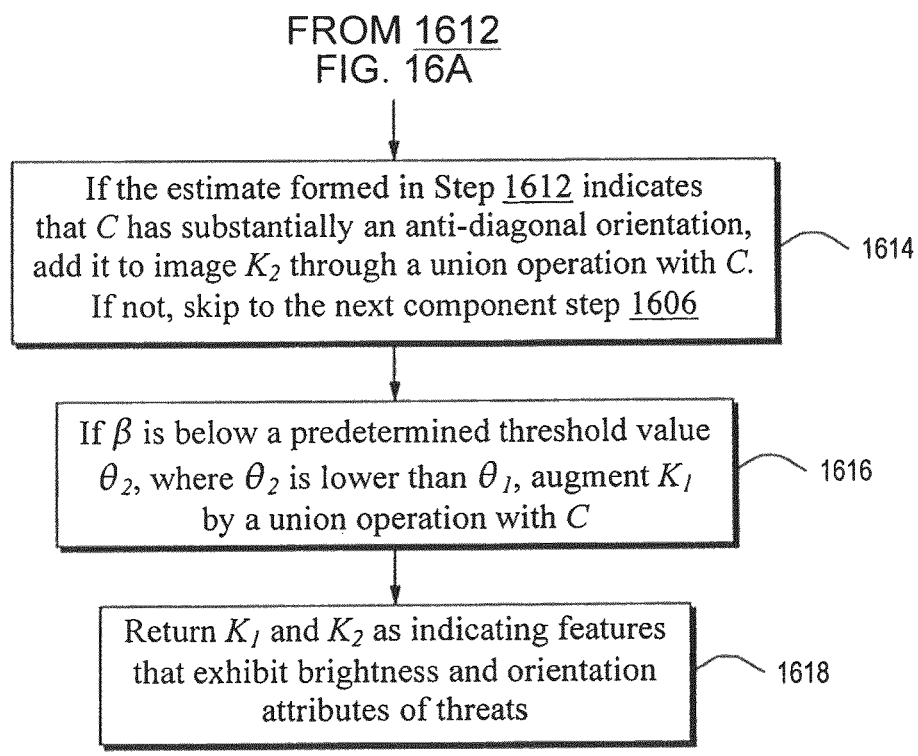

FIG. 16 depicts a method for discriminating between potential threats. The inputs include Binary image U of valley edge features that are potential threats, REI R, binary image S of the segmented REI, foreground-background edge contours L and R, and values of various free parameters. The outputs include binary images $K_1$ and $K_2$ containing subsets of the features in U, corresponding to two different levels of likelihood of being threats. In particular, the method includes computing the median values $m_F$ and $m_B$ of the image brightness of the foreground and background areas of REI R based on the binary segmentation indicated by S, as depicted in step 1602. Identifying the contour M that is midway between L and R, thus indicating the position of the middle of the foreground in the REI, as depicted in step 1604. Identifying the connected components of U, and for each, following Steps 1606a through 1616, as depicted in step 1606. Determining whether C is likely due to clutter, as depicted in step 1606a. If C is likely due to clutter, skipping to the next component. If not, continuing to Step 1608. Computing the median value $m_c$ of the image brightness in image R of the pixels of C using: $\beta=(m_C-m_B)/(m_F-m_B)$, as depicted in step 1610. If $\beta$ exceeds a predetermined threshold value $\theta_1$, skipping to the next component and return to step 1606, otherwise estimating the orientation of C, as depicted in step 1612. Forming a list l of coordinates (x,y) of the pixels in C, denoting the horizontal coordinate of contour M at row y by M(y), modifying each member (x,y) of l to (x−M(y), y), thus rectifying C by removing the effect of the subject's swaying, and estimating the orientation of the rectified feature by fitting a straight line to the modified list of coordinates. If the estimate formed in Step 1612 indicates that, with some tolerance, C has an anti-diagonal orientation, adding it to image $K_2$ through a union operation with C. If not, skipping to the next component step 1606, as depicted in step 1614. If $\beta$ is below a predetermined threshold value $\theta_2$, where $\theta_2$ is lower than $\theta_1$, augmenting $K_1$ by a union operation with C, as depicted in step 1616. Returning $K_1$ and $K_2$ as indicating features that exhibit brightness and orientation attributes of threats, with the first image containing the ones of greater likelihood, as depicted in step 1618.

Figure 17:
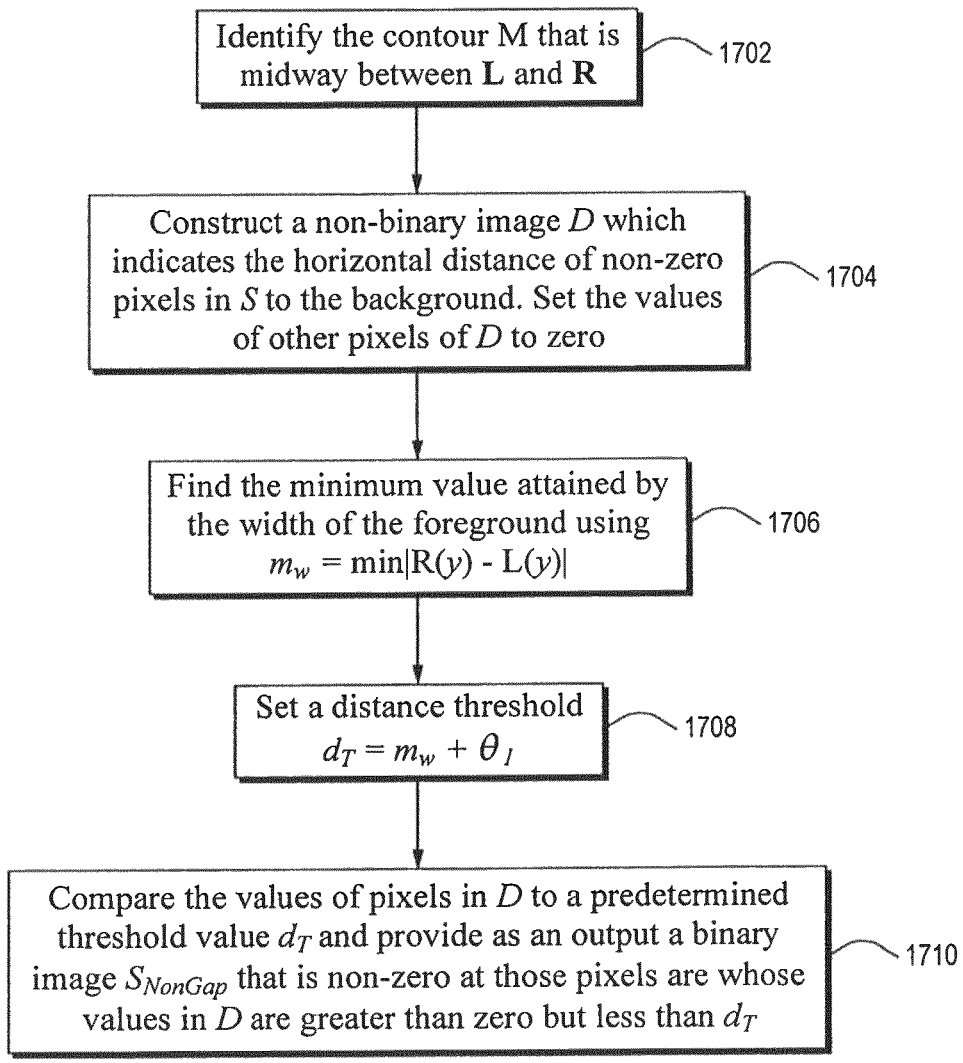
FIG. 17 is a flow chart depicting an embodiment of distinguishing of the gaps between a body's legs in accordance with these teachings.

FIG. 17 depicts a method for estimating the gaps between a subject's legs. The inputs include Binary image S of a segmented REI (with any holes filled in), foreground-background edge contours L and R and values of a free parameter. The output includes image $S_{NonGap}$ that is likely to be the non-gap part of the foreground. In particular the method includes, identifying the contour M that is midway between L and R, thus indicating the position of the middle of the foreground in the REI, as depicted in step 1702. Forming a non-binary image D which indicates the horizontal distance of non-zero pixels in S to the background, as depicted in step 1704. In general, accomplishing this for each row y, by setting the values of pixels of D that lie between L(y) and M(y) to the distance of the pixel to L(y), and for those between M(y) and R(y) to be the distance to R(y). Setting the values of other pixels of D to zero. Find the minimum value $m_W$ attained by the width of the foreground over all the rows of the REI, i.e., $m_W=\min_y |R(y)-L(y)|$, as depicted in step 1706. Setting a distance threshold $d_T=m_W+\theta_1$, where $\theta_1$ is a predetermined input value, as depicted in step 1708. Comparing the values of pixels in D to a predetermined threshold value $d_T$ and providing as an output a binary image $S_{NonGap}$ that is non-zero at those pixels whose values in D are greater than zero but less than $d_T$, as depicted in step 1710.

The techniques described above may be implemented in one or more computer programs executing on a programmable computer including a processor, a storage medium readable by the processor (including, for example, volatile and non-volatile memory and/or storage elements), and, in some embodiments, also including at least one input device, and/or at least one output device. Program code may be applied to data entered using the input device (or user interface) to perform the functions described and to generate output information. The output information may be applied to one or more output devices.

Elements and components described herein may be further divided into additional components or joined together to form fewer components for performing the same functions.

Each computer program (computer readable code) may be implemented itr any programming language, such as assembly language, machine language, a high-level procedural programming language, an object-oriented programming language, or a combination thereof. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, or any other medium from which a computer can read. From a technological standpoint, a signal or carrier wave (such as used for Internet distribution of software) encoded with functional descriptive material is similar to a computer-readable medium encoded with functional descriptive material, in that they both create a functional interrelationship with a computer. In other words, a computer is able to execute the encoded functions, regardless of whether the format is a disk or a signal.

Although the invention has been described with respect to various embodiments, it should be realized these teachings are also capable of a wide variety of further and other embodiments within the spirit and scope of the appended claims.

What is claimed is:

1. An apparatus for detecting concealed weapons disposed on a subject's body, the apparatus comprising:
a millimeter wave camera having a field of view and operative to detect millimeter wave radiation within said field of view and further operative to provide a sequence of images about the periphery of the body;
an image processing system coupled to the millimeter wave camera and operative to:
transform said sequence of images of the periphery of the body into a plurality of spatio temporal images formed by assembling together, for each specific row number, image rows with the specific row number in successive millimeter wave images in the original sequence, said plurality of spatio temporal images corresponding to a plurality of row evolution images;
classify each of said plurality of row evolution image according to its location within the body's image;
identify valley edges in each of said plurality of row evolution images;
calculate the strength of said identified valley edges;
identify ridges in each of said plurality of row evolution images calculate the strength of the identified ridges; and
identify an object of a class of preselected objects as a function of the identified and calculated strength of valley edges and the identified and calculated strength of ridges in each of said plurality of row evolution image; and
said image processing operative to provide an output indicative of an identified object;
wherein to detect valleys and ridges in the row evolution image, the image processing system is further operative to use a predetermined number of finite impulse response filters each of said predetermined number of finite impulse response filters operative to receive one of said plurality of row evolution images and wherein said image processing system being further operative to carry out a row-wise convolution with said one of said row evolution images and a column wise convolution with said one of said row evolution images resulting in a predetermined plurality of images, said image processing system being further operative to combine said predetermined plurality of images to determine the image of dominant local orientation.

2. The apparatus of claim 1 wherein the image processing system is further operative to:
estimate the position of elbows as a function of the sequence of images of the body.

3. The apparatus of claim 1 wherein the image processing system further operative to:
estimate the position of shoulders as a function of the sequence of images of the body.

4. The apparatus of claim 1 wherein the image processing system is further operative to:
estimate the position of legs as a function of the sequence of images of the body.

5. The apparatus of claim 1 wherein the image processing system is further operative to:
estimate the position of torso as a function of the sequence of images of the body.

6. The apparatus of claim 1 wherein said output provided by the image processing system is:
a three-dimensional image formed of the identified threat.

7. The apparatus of claim 1 wherein the image processing system is further operative to:
determine a vertical expanse of said identified threat;
compare said vertical expanse to a predetermined threshold; and
if said vertical expanse exceeds the predetermined threshold, provide the output indicative of an identified threat.

8. The apparatus of claim 1 wherein the image processing system is further operative to:
convert said identified object into a viewable image.

9. The apparatus as in claim 1 wherein the image processing system further comprising a spatial median filter that receives said images from said millimeter wave camera to perform spatial median filtering on said images to provide filtered images.

10. The apparatus as in claim 1 wherein the image processing system further comprising a 2-class segmentation filter that is operative to classify each pixel in the sequence of images received from said millimeter wave camera into one of two classes of pixels.

11. The apparatus of claim 1 wherein the image processing system further comprises a plurality of median filters, each of said plurality of median filter operative to receive one of said plurality of row evolution images and operative to provide a median filtered row evolution image output.

12. The apparatus of claim 11 wherein each of said, plurality of median filters operative to receive said plurality of row evolution images providing a plurality of median filtered row evolution images is provided to a corresponding one of a plurality of valley identification modules, each of said plurality of valley identification modules being operative to locate and identify valley edges in said corresponding one of said plurality of row evolution images.

13. The apparatus of claim 11 wherein each of said plurality of median filtered row evolution images is provided to a corresponding one of a plurality of ridge identification modules, each of said plurality of valley identification modules being operative to locate and identify ridges in said corresponding one of said plurality of row evolution images.

14. The apparatus of claim 1 wherein the image processing system is further operative to compute images $G^{\theta_d}$ and $H^{\theta_d}$ as a function of the dominant local orientation and to combine $G^{\theta_d}$ and $H^{\theta_d}$ to form $E(\theta_d)$ and local phase $\phi$, wherein said $G^{\theta_d}$ and $H^{\theta_d}$ are the net response of the steerable filters steered in the direction of the dominant local orientation and $E(\theta_d)$ and local phase $\phi$ convey the oriented energy and local phase of the REI.

15. The apparatus of claim 14 wherein the image processing system is further operative to calculate $\Lambda_{Valleys}$ as a function of $\phi$ and to determine the image V of the strength of the valley edge features as a function of $E(\theta_d)$ and $\Lambda_{Valleys}$.

16. The apparatus of claim 14 wherein the image processing system is further operative to calculate $\Lambda_{Ridges}$ as a function of $\phi$ and to determine the image W of the strength of the ridge features as a function of $E(\theta_d)$ and $\Lambda_{Ridges}$.

17. The apparatus of claim 15 wherein the image processing system is further operative to compare the image V with a first threshold value and identifying a candidate threat if, among other conditions, the image V exceeds the first threshold value.

18. The apparatus of claim 15 wherein the image processing system is further operative to compare the image V with a second threshold value and if, among other conditions, the image V exceeds the second threshold value identifying a candidate threat if the image V exceeds the first threshold value.

19. The apparatus of claim 1 wherein the image processing system further comprising a clutter discrimination module that discriminates clutter from a threat as a function of the configuration and strength of the valley edges and ridges.

20. A method of detecting objects on a body, the method comprising:
obtaining a plurality of spatial images of the body scanned by a millimeter wave imager;
performing median filtering of each of the plurality of spatial images;
segmenting in a two-class segmentation based on millimeter wave (MMW) brightness each of the plurality of spatial MMW images;
estimating height of the top and bottom of the body's torso;
partitioning the rows of the plurality of spatial images into three groups: arms, torso, and legs;
transforming into a plurality of spatio-temporal Row Evolution Images (REIs) the plurality of spatial MMW images;
transforming into a plurality of spatio-temporal Row Evolution Images (REIs) the plurality of segmented spatial MMW images;
performing median filtering of each of the plurality of REIs from the plurality MMW images;
extracting valley and ridge edge features in each of the plurality of REIs from the plurality MMW images;
detecting candidate threat features;
gathering all candidate threats from the separate REIs into a single 3D image;
determining the vertical spatial expanse of the candidate threat regions in the 3D image;
accepting as threats those candidates with significant spatial expanse; and
conveying the detected threats to the system user;
wherein the step of estimating includes:
identifying in the plurality of segmented spatial MMW images a subset that includes the frontal view of the body,
performing the following steps on each image S of the subset of images that includes the frontal view of the body,
erasing any bright specks from the background and filling any holes in image S to obtain S',
identifying the connected component, C, of image S' that has the largest area,
calculating the centroid, c, and bounding box of C,
identifying the rows corresponding to the top third of the body using the upper edge of the above bounding box as a rough estimate of the height of the body,
estimating the location of the body's elbows by finding the two pixels $p_L$ and $p_R$ on the perimeter of C that lie on the top third of the body and which have the maximal displacement to the left and right of the centroid, c,
appending the coordinates of $p_L$ and $p_R$ to a list of estimates of estimated elbow locations,
selecting the one of the plurality of images in S' where the left and right estimations have essentially equal and opposite horizontal displacements from the estimated centroid, c,
designating by e the row number of the higher of the two elbows in this selected image,
determining, t, the approximate height of the body's shoulders,
determining b, the approximate bottom of the torso (crotch height), and
providing t and b as outputs.

21. The method of claim 20 wherein the step of determining, t, includes
using a predetermined constant $\theta_1$, wherein the shoulders are below the elbow row by $t=e+\theta_1$.

22. The method of claim 20 wherein the step of determining b includes
using predetermined values $\theta_2$ and $\theta_3$: to find $b=N_Y-\theta_2(N_Y-t)-\theta_3$.

23. The method of claim 20 wherein the step of transforming the plurality of spatial images includes:
determining the height $N_Y$, width $N_X$, and number of frames of N of the plurality spatial images;
allocating space for $N_Y$ row evolution images, each of height N and width $N_X$ in memory;
performing for each index value in the ranges $1 \leq i \leq N$, $1 \leq j \leq N_X$, $1 \leq k \leq N_Y$; and
storing at the location of the pixel at row i and column j of REI k, the brightness of the pixel at row k and column j of image i of the input sequence.

24. The method of claim 20 wherein the step of extracting valley and ridge edge features includes for each image R of the plurality of REIs formed from the plurality of MMW images:

performing row-wise convolution of image R with the first members of seven ordered pairs of impulse responses $(g_{f1}, g_{f2})$, $(g_{f3}, g_{f3})$, $(g_{f2}, g_{f1})$, $(h_{f1}, h_{f2})$, $(h_{f4}, h_{f3})$, $(h_{f3}, h_{f4})$, $(h_{f2}, h_{f1})$;

performing column wise convolution of the results of the row wise convolutions with the second of the members of the seven ordered pairs of impulse responses $(g_{f1}, g_{f2})$, $(g_{f3}, g_{f3})$, $(g_{f2}, g_{f1})$, $(h_{f1}, h_{f2})$, $(h_{f4}, h_{f3})$, $(h_{f3}, h_{f4})$, $(h_{f2}, h_{f1})$ and denote the resulting seven images $G_a$, $G_b$, $G_c$, $H_a$, $H_b$, $H_c$, $H_d$;

combining the images $G_a$, $G_b$, $G_c$, $H_a$, $H_b$, $H_c$, $H_d$ to compute the image of dominant local orientation $\theta_d$;

computing images $G^{\theta_d}$ and $H^{\theta_d}$, as a function of $\theta_d$;

combining the images $G^{\theta_d}$ and $H^{\theta_d}$ to obtain the images $E(\theta_d)$ and $\phi$;

calculating the images $\Lambda_{Valleys}$ and $\Lambda_{Ridges}$ of phase preference factors from image $\phi$;

obtaining the images V and W of 1 the strengths of valley edge and ridge features as the products of image $E(\theta_d)$ with $\Lambda_{Valleys}$ and $\Lambda_{Ridges}$ respectively.

25. The method of claim 24 wherein the seven ordered pairs of impulse responses $(g_{f1}, g_{f2})$, $(g_{f3}, g_{f3})$, $(g_{f2}, g_{f1})$, $(h_{f1}, h_{f2})$, $(h_{f4}, h_{f3})$, $(h_{f3}, h_{f4})$, $(h_{f2}, h_{f1})$ are the impulse responses for steerable filters.

26. The method of claim 20 wherein the step of detecting candidate threat features includes:

using as inputs image R from the plurality of REIs of the torso group formed from the plurality of MMW images, image S of the plurality of REIs that corresponds to the same row as image R and is formed from the segmented MMW images, images V and W that indicate the valley and ridge edge strength in image R;

filtering the image S to obtain a binary image S' by erasing bright specks of noise from the background and filling in any holes in the foreground;

selecting the contours in S', bounding the left and right sides of the foreground;

denoting the selected contours by L and R respectively;

finding any anomalies in the foreground of image S' to provide images S" and L;

computing the product of the V and S" and provide as an output an image $V_{FG}$;

comparing image $V_{FG}$ to a predetermined parameter $\theta_1$ to obtain binary image $V'_{FG}$;

using hysteresis thresholding, compare $V_{FG}$ to predetermined hysteresis threshold values $\theta_1$ and $\theta_2$ to obtain $V''_{FG}$;

computing the product of the images W and S" and provide as an output the image $W_{FG}$;

comparing $W_{FG}$ to a predetermined threshold value $\theta_2$ and provide as an output image $W'_{FG}$;

forming the binary image B indicative of the background as the complement of S", morphological dilating B, and providing as an output image B';

determining which of the connected components of $V''_{FG}$ overlap with the non-zero pixels of B' and indicate them by image $V''_{TouchBG}$;

applying hysteresis thresholding to $V_{FG}$, using a predetermined upper threshold value $\theta_4$ that is higher than threshold values $\theta_1$ and $\theta_2$ to provide as an output a binary image $V'''_{FG}$, that is indicative of the location of valleys having strength greater than those indicated by $V''_{FG}$;

creating images $T_1$ and $T_2$ each of which has an initial pixel values the union of $V''_{TouchBG}$, $V'''_{FG}$, and L;

creating the binary image $V''_{Residual}$ by subtracting $V''_{TouchBG}$ from $V''_{FG}$;

selecting a plurality of connected components of $V''_{Residual}$ and performing the following 4 steps on each selected component C determining if the connected component C is clutter in the event that the connected components is not clutter augmenting $T_2$ with the union of $T_2$ with C;

in the event that the connected component C is not clutter, determining whether a suitable path exists from the endpoints of C to the background;

in the event that a suitable path exists augmenting $T_1$ with the union of $T_1$ with C;

performing a Boolean AND operation of $V'_{FG}$ and the complement of S to create the binary image D;

discarding from D those of its distinct regions that span fewer than a predetermined number of rows, $\theta_5$, and provide the image D';

determining which of the connected components, C, of $V'_{FG}$ that overlap non-zero pixels of D', and form a binary image U;

comparing the features to a predetermined value to determine features having a lower than expected image intensity may be threats and form images $K_1$ and $K_2$ of the more likely threats and less likely threats respectively;

augmenting both $T_1$ and $T_2$ through union operations with $K_1$, and augment $T_2$ by a union with $K_2$; and providing as outputs the binary images $T_1$ and $T_2$, wherein a candidate threat is one that exceeds a higher and lower level of threat likelihood respectively.

27. The method of claim 26 wherein the step of finding anomalies in the foreground includes:

creating four structuring elements;

Morphologically closing the image S' using the first element and providing as an output the result $S'_{eL}$;

morphologically closing of image S' with the structuring element $e_R$, and naming the result $S'_{eR}$;

Calculating the product of images $S'_{eL}$ and $S'_{eR}$ and naming the result $S'_e$;

calculating the difference image of the binary images $S'_e$ and S', and providing as an output the result D;

Morphologically closing the image S' using the structuring element $1_R$, and providing the result $S'_{lL}$;

Morphologically closing the image S' using structuring element $1_R$, and providing the result $S'_{lR}$;

Calculating the product of images D and $S'_{lL}$ and providing as an output the result $D_L$;

Calculating the product of images D and $S'_{lR}$ and providing the result $D_R$ as an output;

Morphologically reconstructing with $D_L$ serving as the marker image and D as the mask image and providing the result $D'_L$ as an output;

Morphologically reconstructing with $D_R$ serving as the marker image and D as the mask image and providing the result $D'_R$ as an output;

Calculating the product of images $D'_L$ and $D'_R$, and providing the result L as an output; and Performing a Boolean OR operation of images S' and L, and providing the result S" as an output.

28. The method of claim 27 wherein the step of creating 4 structuring elements includes:

creating a first structuring element $e_L$ shaped substantially like a right isosceles triangle with the two equal sides flaring symmetrically towards the upper left and lower left;

creating a second structuring element $e_R$ shaped substantially like a right isosceles triangle with the two equal sides flaring symmetrically towards the upper right and lower right;

creating a third structuring element $l_L$ having an image footprint substantially shaped like a horizontal line segment extending leftwards from the origin; and creating a fourth structuring element $l_R$ having an image footprint substantially shaped like a horizontal line segment extending rightwards from the origin.

29. The method of claim 26 wherein the step of discriminating threats from clutter includes:

using as inputs image F of the REI feature to be judged, and the foreground-background edge contours L and R;

finding the number of rows spanned by the non-zero pixels of REI feature F, $\tau$;

in the event that $\tau$ is less than a predetermined threshold value $\theta_1$, label the feature as not being clutter and end;

otherwise, calculating the horizontal distance values $d_L$ and $d_R$ of the feature from L and R for each of the $\tau$ rows it spans;

calculating the minimum values $m_L$ and $m_R$ attained by $d_L$ and $d_R$;

denoting by $m_{L,R}$ the lesser of $m_L$ and $m_R$;

computing the straight lines that best fit $d_L$ and $d_R$ when regarded as functions of the row index and denoting by $s_L$ and $s_R$ the slopes of the respective lines;

computing measures of deviation of $d_L$ and $d_R$ from their respective straight line fits and denote them by $\delta_L$ and $\delta_R$;

computing nine binary scores (0 or 1) by comparing the values of $s_L$, $s_R$, $\delta_L$, $\delta_R$, and $m_{L,R}$ against predetermined threshold values $\theta_2$ through $\theta_{10}$;

computing a composite score for gauging the feature's likeness to clutter as the weighted sum of the nine; and in the event that composite score below a predetermined threshold $\theta_{11}$, declaring the feature as one likely to be clutter, otherwise, declaring the feature likely to be a threat.

30. The method of claim 26 wherein the step of finding extensibility of an REI feature includes:

using as inputs binary image F of the REI valley feature, binary image $S_1$ indicating foreground area of the REI, image B indicating a slightly expanded version of the background area of the REI, binary image W indicating significant ridges in the foreground of the REI, and foreground-background edge contours L and R;

locating the right and left endpoints, $r_e$ and $l_e$, of the feature in F;

creating a binary image G indicating a specific region of interest shaped substantially like a rectangle extending upward from $r_e$, with height given by a predetermined value $\theta_1$, with width extending from $r_e$ to the right border of the REI, and abutting to the left side of the rectangle portion of the region of interest area a wedge shaped zone flaring out from $r_e$ in an upward and leftward orientation having a leftmost vertex of this wedge shaped augmentation a portion of the width of the foreground at the leftmost point of R in the interval of $\theta_1$ rows above $r_e$;

creating another region of interest shaped substantially like a rectangle extending downward from $l_e$, with height given by a predetermined value $\theta_1$, with width extending from $l_e$ to the left border of the REI, and abutting to the right side of the rectangle portion of the region of interest area a wedge shaped zone flaring out from $l_e$ in a downward and rightward orientation having a rightmost vertex of this wedge shaped augmentation a portion of the width of the foreground at the rightmost point of L in the interval of $\theta_1$ rows below $l_e$, adding this region of interest to G;

performing Boolean AND operation with G and $S_1$ and the complement of the binary image W, and providing as an output G';

providing a binary image E whose only non-zero pixels are the endpoints of the valley feature;

morphologically reconstructing using E as the marker image and G' as the mask image and providing as an output the resultant image, denoted H;

performing a Boolean AND operation of H with B, the slightly expanded version of the background, and provide as an output the result H';

comparing the pixels in H' to zero;

in the event that there are non-zero pixels in H' declaring the feature to be extensible; and otherwise, declaring the feature to be not extensible.

31. The method of claim 26 wherein the step for discriminating between potential threats includes:

using as inputs REI R, image U of REI valley edge features that are potential threats, image S indicating foreground area of the REI, foreground-background edge contours L and R;

computing the median values $m_F$ and $m_B$ of the image brightness of the foreground and background areas of R based on the binary segmentation indicated by S;

selecting the contour M that is midway between L and R;

selecting the connected components of U;

performing the following 10 steps for each connected component, C, of U:

determining whether C is likely due to clutter in the event that C is likely due to clutter, stopping and going to the next component;

in the event that C is not likely due to clutter computing the median value $m_C$ of the image brightness in image R of the pixels of C;

calculating a measure $\beta$ of the relative brightness of C using:

$$\beta = (m_C - m_B)/(m_F - m_B);$$

comparing $\beta$ to a predetermined threshold value $\theta_1$, in the event that $\beta$ is greater than the threshold value $\theta_1$, stopping and going to the next component;

otherwise estimating the orientation of C by forming a list l of coordinates (x,y) of the pixels in C and denoting the horizontal coordinate of contour M at row y by M(y) and modifying each member (x,y) of l to (x−M(y), y);

in the event that C has substantially an anti-diagonal orientation, adding it to image $K_2$;

otherwise stopping and going to the next component;

comparing $\beta$ to a predetermined threshold value $\theta_2$ where $\theta_2$ is lower than $\theta_1$;

in the event that $\beta$ is less than the predetermined threshold value $\theta_1$, augmenting $K_1$ by a union operation with C; and providing $K_1$ and $K_2$ as indicating features that exhibit brightness and orientation attributes of threats of a higher and lower level of threat likelihood respectively.

32. The method of claim 20 wherein the step of detecting candidate threat features includes:

using as inputs image R from the plurality of REIs of the legs group formed from the plurality of MMW images, image S of the plurality of REIs that corresponds to the same row as image R and is formed from the segmented MMW images, images V and W that indicate the valley and ridge edge strength in image R;

filtering the image S to obtain a binary image S' by erasing bright specks of noise from the background and filling in any holes in the foreground;

detecting anomalies in the edges of the foreground of image S' and obtaining as outputs the images S", L, and the foreground-background edge contours L and R;

estimating the gap between the body's legs and obtaining as an output the image $S''_{NonGap}$;

performing a Boolean And operation of L and $S''_{NonGap}$ and provide as an output the result L;

determining the set of connected components in L;

for each connected component of L, determining if the detected anomaly is due to clutter, if it is clutter, removing the component from L;

removing pixels from L that are very close to the foreground-background edge contours by performing morphological erosion on S" and providing the output as S'" and performing a Boolean And operation of L and S'" and providing as an output the result L';

carrying out the morphological opening L' and providing as an output the result L";

computing the product of the images V and $S''_{NonGap}$, and naming it $V_{FG}$;

comparing image $V_{FG}$ to a predetermined parameter $\theta_1$ to obtain binary image $V'_{FG}$;

using hysteresis thresholding, comparing $V_{FG}$ to predetermined hysteresis threshold values $\theta_1$ and $\theta_2$ to obtain $V''_{FG}$;

computing the product of the images W and S" and providing as an output the image $W_{FG}$;

comparing $W_{FG}$ to a predetermined threshold value $\theta_3$ and providing as an output image $W'_{FG}$;

forming the binary image B indicative of the background as the complement of S", carrying out morphological dilation of B, and providing as an output image B';

determining which of the connected components of $V''_{FG}$ have overlap with the non-zero pixels of B' and providing them in image $V''_{TouchBG}$;

using hysteresis thresholding by comparing $V_{FG}$, to a predetermined upper threshold value $\theta_4$ that is higher than threshold values $\theta_1$ and $\theta_2$ to provide as an output a binary image $V'''_{FG}$, that is indicative of the location of valleys having strength greater than those indicated by $V''_{FG}$;

creating images $T_1$ and $T_2$ having an initial pixel values the union of $V''_{TouchBG}$, $V'''_{FG}$, and L, respectively;

creating the binary image $V''_{Residual}$ by subtracting $V''_{TouchBG}$ from $V''_{FG}$;

selecting a plurality of connected components of $V''_{Residual}$ and performing the following 4 steps on each of selected component C determining if the connected component C is clutter in the event that the connected components is not clutter augmenting $T_2$ with the union of $T_2$ with C;

in the event that the connected component C is not clutter, determining whether a suitable path exists from the endpoints of C to the background;

in the event that a suitable path exists augmenting $T_1$ with the union of $T_1$ with C;

performing a Boolean AND operation of $V'_{FG}$ and the complement of S to create the binary image D;

discarding from D those of its distinct regions that span fewer than a predetermined number of rows, $\theta_5$, and providing an output image D';

selecting which of the connected components of $V'_{FG}$ overlap non-zero pixels of D', and form a binary image U;

determining whether the features having a lower than expected image intensity may be threats and form images $K_1$ and $K_2$ of the more likely threats and less likely threats respectively;

performing a Boolean AND with $K_1$ and S";

applying morphological opening on the result of the Boolean operation and providing as an output $K'_1$;

performing a Boolean AND operation on $K_2$ with S";

applying morphological opening on the result of the Boolean AND operation and providing as an output the result $K'_2$;

augmenting both $T_1$ and $T_2$ through union operations with $K'_1$, and $T_2$ by a union with $K'_2$; and providing as outputs the binary images $T_1$ and $T_2$ which indicate candidates exceeding a higher and lower level of threat likelihood respectively.

33. The method of 32 wherein the step of identifying anomalies at the edges in binary image S' that conveys the foreground of REI R of the legs groups of REIs:

creating an image S" and initializing the pixel values with the corresponding pixel values of image S';

selecting the edge contours in image S' bounding the left and right sides of the foreground and denote them by L and R respectively;

determining whether there are points where L and R exhibit abrupt breaks by computing the horizontal displacements $|L(y)-L(y-1)|$ and $|R(y)-R(y-1)|$;

comparing the horizontal displacements with a predetermined threshold $\theta_5$;

in the event that there is a break in R in row $y_b$ performing the following 4 steps:

In each row exhibiting a break, identifying a rectangular region of interest (ROI) extending downward a predetermined height $\theta_6$ pixels from row $y_b$ and substantially to the right of the identified breakpoint from the leftmost point attained by the section of the contour R between rows $y_b$ and $y_b+\theta_6$ up to the right border of image R;

performing a binary segmentation of the pixels in image R in the ROI;

selecting a subset of the ROI of the pixels that lie to the left of the line joining the points on R at rows $y_b$ and $y_b+\theta_6$;

setting the values of pixels in S" that belong to the subset of the ROI to 0 or 1 according to the results of the segmentation;

in the event that there is a break in L in a row $y_b$ perform the next 4 steps:

selecting a rectangular region of interest (ROI) extending upward a height $\theta_6$ pixels from row $y_b$ and mostly to the left of the breakpoint between rows $y_b-\theta_6$ and $y_b$ up to the left border of image R;

performing a binary segmentation of the pixels of R in the ROI;

selecting a subset of the ROI consisting pixels that lie to the right of the line joining the points on L at rows $y_b-\theta_6$ and $y_b$;

setting the values of pixels in S" that belong to the subset of the ROI in the previous step to 0 or 1 according to the results of the segmentation;

selecting the contours in the resulting image S" that bound the left and right sides of the foreground, and denote these updated contours by L and R respectively; and providing as a binary image L and set to 1 those of its pixels that have value 0 in S' but 1 in S".

34. The method of claim 32 wherein the step of discriminating threats from clutter includes:

using as inputs image F of the REI feature to be judged and the foreground-background edge contours L and R;

finding the number of rows spanned by the non-zero pixels of F, $\tau$;

in the event that $\tau$ is less than a predetermined threshold value $\theta_3$, label the feature as not being clutter and end;

otherwise, calculating the horizontal distance values $d_L$ and $d_R$ of the feature from L and R for each of the τ rows it spans;

calculating the minimum values $m_L$ and $m_R$ attained by $d_L$ and $d_R$;

denoting by $m_{L,R}$ the lesser of $m_L$ and $m_R$;

computing the straight lines that best fit $d_L$ and $d_R$ when regarded as functions of the row index and denoting by $s_L$ and $s_R$ the slopes of the respective lines;

computing measures of deviation of $d_L$ and $d_R$ from their respective straight line fits and denote them by $\delta_L$ and $\delta_R$;

computing nine binary scores (0 or 1) by comparing the values of $s_L$, $s_R$, $\delta_L$, $\delta_R$, and $m_{L,R}$ against predetermined threshold values $\theta_4$ through $\theta_{12}$;

computing a composite score for gauging the feature's likeness to clutter as the weighted sum of the nine; and in the event that composite score below a predetermined threshold $\theta_{13}$, declaring the feature as one likely to be clutter, otherwise, declaring the feature likely to be a threat.

35. The method of claim 32 wherein the step of finding extensibility of a feature includes:

using as inputs binary image F of the REI valley feature, binary image S indicating foreground area of the REI, image B indicating a slightly expanded version of the background area of the REI, binary image W indicating significant ridges in the foreground of the REI, and foreground-background edge contours L and R;

locating the right and left endpoints, $r_e$ and $l_e$, of the feature in F;

creating a binary image G indicating a specific region of interest shaped substantially like a rectangle extending upward from $r_e$, with height given by a predetermined value $\theta_1$, with width extending from $r_e$ to the right border of the REI, and abutting to the left side of the rectangle portion of the region of interest area a wedge shaped zone flaring out from $r_e$ in an upward and left ward orientation having a leftmost vertex of this wedge shaped augmentation a portion of the width of the foreground at the leftmost point of R in the interval of $\theta_1$ rows above $r_e$;

creating another binary image indicating a specific region of interest shaped substantially like a rectangle extending downward from $l_e$, with height given by a predetermined value $\theta_1$, with width extending from $l_e$ to the left border of the REI, and abutting to the right side of the region of interest area a wedge shaped zone flaring out from $l_e$ in a downward and rightward orientation having a rightmost vertex of this wedge shaped augmentation a portion of the width of the foreground at the leftmost point of L in the interval of $\theta_1$ rows below $l_e$, adding this region of interest to G;

performing Boolean AND operation with G and S and the complement of the binary image W, and providing as an output G';

providing a binary image E whose only non-zero pixels are the endpoints of the valley feature;

morphologically reconstructing using E as the marker image and G' as the mask image and providing as an output the resultant image, denoted H;

performing a Boolean AND operation of H with B, the slightly expanded version of the background, and providing as an output the result H';

comparing the pixels in H' to zero in the event that there are non-zero pixels in H' declaring the feature to be extensible; and otherwise, declaring the feature to be not extensible.

36. The method of claim 32 wherein the step for discriminating between potential threats includes:

using as inputs REI R, image U of REI valley edge features that are potential threats, image S indicating foreground area of the REI, foreground-background edge contours L and R;

computing the median values $m_F$ and $m_B$ of the image brightness of the foreground and background areas of R based on the binary segmentation indicated by S;

selecting the contour M that is midway between L and R;

selecting the connected components of U;

performing the following 11 steps for each connected component C of U:

determining whether C is likely due to clutter;

in the event that C is likely due to clutter, stopping and going to the next component;

in the event that C is not likely due to clutter computing the median value $m_C$ of the image brightness in image R of the pixels of C;

calculating a measure β of the relative brightness of C using:

$$\beta = (m_C - m_B)/(m_F - m_B);$$

comparing β to a predetermined threshold value $\theta_3$, in the event that β is greater than the threshold value $\theta_3$, stopping and going to the next component;

otherwise estimating the orientation of C by forming a list l of coordinates (x,y) of the pixels in C and denoting the horizontal coordinate of contour M at row y by M(y) and modifying each member (x,y) of l to (x−M(y), y);

in the event that C has substantially an anti-diagonal orientation, adding it to image $K_2$;

otherwise stopping and going to the next component;

comparing β to a predetermined threshold value $\theta_4$ where $\theta_4$ is lower than $\theta_3$, in the event that β is less than the predetermined threshold value $\theta_4$, augmenting $K_1$ by a union operation with C; and providing $K_1$ and $K_2$ as indicating features that exhibit brightness and orientation attributes of threats of a higher and lower level of threat likelihood respectively.

37. The method of claim 32 wherein the step of estimating the gaps between a body's legs includes:

using as inputs binary image S indicating foreground area of the REI with holes filled in, and foreground-background edge contours L and R;

selecting the contour M that is midway between L and R;

providing a non-binary image D which indicates the horizontal distance of non-zero pixels in S to the background, wherein for each row y, set the values of pixels of D that lie between L(y) and M(y) to the distance of the pixel to L(y), and for those between M(y) and R(y) to be the distance to R(y) and setting the values of other pixels of D to zero;

finding the minimum value $m_W$ attained by the width of the foreground over all the rows of the REI by $m_W = \min_y |R(y) - L(y)|$;

providing a distance threshold $d_T = m_W + \theta_3$, where $\theta_3$ is a predetermined input value;

comparing the values of pixels in D to a predetermined threshold value $d_T$; and providing an output a binary image $S_{NonGap}$ that is non-zero at those pixels whose values in D are greater than zero but less than $d_T$.

38. An apparatus for detecting concealed weapons disposed on a subject's body, the apparatus comprising:
  a millimeter wave camera having a field of view and operative to detect millimeter wave radiation within said field of view and further operative to provide a sequence of images about the periphery of the body;
  a image processing system coupled to the millimeter wave camera and operative to:
    transform said sequence of images of the periphery of the body into a plurality of spatio temporal images formed by assembling together, for each specific row number, all those image rows with the specific row number in successive millimeter wave images in the original sequence, said plurality of spatio temporal images corresponding to a plurality of row evolution images;
    classify each of said plurality of row evolution image according to its location within the body's image;
    identify valley edges in each of said plurality of row evolution images;
    calculate the strength of said identified valley edges;
    identify ridges in each of said plurality of row evolution images
    calculate the strength of the identified ridges; and
    identify an object of a class of preselected objects as a function of the identified and calculated strength of valley edges and the identified and calculated strength of ridges in each of said plurality of row evolution image; and
  said image processing operative to provide an output indicative of an identified object;
  wherein said image processor comprises:
    at least one processor; and
    at least one computer usable medium having computer readable code embodied therein, the computer readable code being capable of causing said at least one processor to:
      transform said sequence of images of the periphery of the body into a plurality of row evolution images and classify each of said plurality of row evolution image according to its location within the body's image;
      identify valley ridges in each of said plurality of row evolution images
      calculate the strength of identified valley edges;
      identify ridges in each of said plurality of row evolution images
      calculate the strength of the identified ridges; and
      identify a threat as a function of the identified valleys and their corresponding strength and of the identified ridges and their calculated strength in each of said plurality of row evolution image; and
      provide an output indicative of an identified threat.

39. The system of claim 38 wherein the computer readable code is further capable of causing said at least one processor to: estimate the position of elbows as a function of the sequence of images of the body.

40. The system of claim 38 wherein the computer readable code is further capable of causing said at least one processor to:
  estimate the position of shoulders as a function of the sequence of images of the body.

41. The system of claim 38 wherein the computer readable code is further capable of causing said at least one processor to:
  estimate the position of legs as a function of the sequence of images of the body.

42. The system of claim 38 wherein the computer readable code is further capable of causing said at least one processor to:
  estimate the position of torso as a function of the sequence of images of the body.

43. The system of claim 42 wherein the computer readable code is further capable of causing said at least one processor to:
  a three-dimensional image formed of the identified threat.

44. The system of claim 38 wherein the computer readable code is further capable of causing said at least one processor to:
  determine a vertical expanse of said identified threat;
  compare said vertical expanse to a predetermined threshold; and
  if said vertical expanse exceeds the predetermined threshold, provide the output indicative of an identified threat.

45. The system of claim 38 wherein the computer readable code is further capable of causing said at least one processor to:
  convert said identified object into a viewable image.

46. The system of claim 38 wherein the computer readable code is further capable of causing said at least one processor to filter using a spatial median filter that receives said images from said millimeter wave camera to perform spatial median filtering on said images to provide filtered images.

47. The system of claim 38 wherein the computer readable code is further capable of causing said at least one processor to segment using 2-class segmentation processing that is operative to classify each pixel in the sequence of images received from said millimeter wave camera into one of two classes of pixels.

48. The system of claim 38 wherein the computer readable code is further capable of causing said at least one processor to filter using a plurality of median filters, each of said plurality of median filter operative to receive one of said plurality of row evolution images and operative to provide a median filtered row evolution image output.

49. The system of claim 48 wherein the computer readable code is further capable of causing said at least one processor to: identify valley edges in each of said plurality of median filtered row evolution images.

50. The system of claim 48 wherein the computer readable code is further capable of causing said at least one processor to identify ridges in said corresponding one of said plurality of row evolution images.

51. The system of claim 38 wherein the computer readable code is further capable of causing said at least one processor to use a predetermined number of finite impulse response filters, each of said predetermined number of finite impulse response filters operative to receive one of said plurality of row evolution images and wherein said image processing system being further operative to carry out a row-wise convolution with said one of said row evolution images and a column wise convolution with said one of said row evolution images resulting in a predetermined plurality of images, said image processing system being further operative to combine said predetermined plurality of images to determine the image of dominant local orientation.

52. The system of claim 51 wherein the computer readable code is further capable of causing said at least one processor to: compute images $G^{\theta_d}$ and $H^{\theta_d}$ as a function of the dominant local orientation and to combine $G^{\theta_d}$ and $H^{\theta_d}$ to form $E(\theta_d)$ and $\phi$.

53. The system of claim 52 wherein the computer readable code is further capable of causing said at least one processor to: calculate $\Lambda_{Valleys}$ as a function of $\phi$ and to determine the image V of the strength of the valley edge features as a function of $E(\theta_d)$ and $\Lambda_{Valleys}$.

54. The system of claim 52 wherein the computer readable code is further capable of causing said at least one processor to: calculate $\Lambda_{Ridges}$ as a unction of $\phi$ and to determine the image W of the strength of the ridge features as a function of $E(\theta_d)$ and $\Lambda_{Ridges}$.

55. The system of claim 53 wherein the computer readable code is further capable of causing said at least one processor to: compare the image V with a first threshold value and identifying a threat if, among other conditions, the image V exceeds the first threshold value.

56. The system of claim 38 wherein the computer readable code is further capable of causing said at least one processor to discriminates clutter from a threat as a function of the configuration and strength of the valley and ridge edges.

\* \* \* \* \*